(12) United States Patent
Polesel et al.

(10) Patent No.: US 12,123,389 B2
(45) Date of Patent: Oct. 22, 2024

(54) OCEAN WAVE ENERGY HARVESTING SYSTEM

(71) Applicant: LUXEMBOURG INSTITUTE OF SCIENCE AND TECHNOLOGY (LIST), Esch/Alzette (LU)

(72) Inventors: Jérôme Polesel, Esch/Alzette (LU); Bruno Soares, Esch/Alzette (LU); Mathieu Gerard, Esch/Alzette (LU)

(73) Assignee: LUXEMOBURG INSTITUTE OF SCIENCE AND TECHNOLOGY, Esch-sur-Alzette (LU)

( * ) Notice: Subject to any disclaimer, the term of this patent is extended or adjusted under 35 U.S.C. 154(b) by 89 days.

(21) Appl. No.: 18/248,777

(22) PCT Filed: Oct. 13, 2021

(86) PCT No.: PCT/EP2021/078301
§ 371 (c)(1),
(2) Date: Apr. 12, 2023

(87) PCT Pub. No.: WO2022/079096
PCT Pub. Date: Apr. 21, 2022

(65) Prior Publication Data
US 2023/0407834 A1    Dec. 21, 2023

(30) Foreign Application Priority Data

Oct. 13, 2020  (LU) ........................ 102112

(51) Int. Cl.
 *F03B 13/20*   (2006.01)
 *F03B 17/02*   (2006.01)
(52) U.S. Cl.
 CPC ............ *F03B 13/20* (2013.01); *F03B 17/025* (2013.01); *F05B 2240/93* (2013.01); *F05B 2250/44* (2020.08); *F05B 2260/4031* (2013.01)

(58) Field of Classification Search
 CPC ........................................ F03B 13/20
 See application file for complete search history.

(56) References Cited

U.S. PATENT DOCUMENTS

| 1,403,912 | A | * | 1/1922 | Osborne | F03G 7/08 |
| | | | | | 185/29 |
| 4,071,114 | A | * | 1/1978 | Schera, Jr. | F03G 7/08 |
| | | | | | 60/501 |

(Continued)

FOREIGN PATENT DOCUMENTS

| GB | 2556971 A | 6/2018 |
| WO | 2006/106184 A1 | 10/2006 |
| WO | 2015/144956 A1 | 10/2015 |

OTHER PUBLICATIONS

International Search Report, International Application No. PCT/EP2021/078301, dated Feb. 2, 2022, 3 pages.

*Primary Examiner* — Tulsidas C Patel
*Assistant Examiner* — Thomas K Quigley
(74) *Attorney, Agent, or Firm* — RANKIN, HILL & CLARK LLP

(57) ABSTRACT

A system configured for producing electric power from sea waves. The system includes a buoyant body; an electric generator including an input shaft adapted to rotate with respect to the buoyant body; a first arm coupled to the electric generator; a second arm; and a pivot joint rotatably joining the second arm to the arm. The pivot joint is at a distance, along the first arm, from the input shaft. The first arm connects the second arm to the generator. The tandem arms form a double pendulum system powering an autonomous floating sea analysing station.

20 Claims, 10 Drawing Sheets

(56) References Cited

U.S. PATENT DOCUMENTS

| | | | | |
|---|---|---|---|---|
| 4,241,615 A * | 12/1980 | Ryan | ............ | B06B 1/167 74/61 |
| 4,266,143 A * | 5/1981 | Ng | ............ | F03B 13/20 60/505 |
| 4,352,023 A * | 9/1982 | Sachs | ............ | F03B 13/20 60/507 |
| 4,423,334 A * | 12/1983 | Jacobi | ............ | F03B 13/20 290/53 |
| 4,438,343 A * | 3/1984 | Marken | ............ | F03B 13/16 60/507 |
| 6,681,572 B2 * | 1/2004 | Flory | ............ | E02B 9/08 60/497 |
| 6,923,693 B2 * | 8/2005 | Borgen | ............ | B63H 1/36 440/15 |
| 7,239,038 B1 * | 7/2007 | Zimmerman | ............ | F03B 13/20 290/43 |
| 7,737,569 B2 * | 6/2010 | Hench | ............ | F03B 13/20 290/55 |
| 7,989,975 B2 * | 8/2011 | Clement | ............ | F03B 13/20 290/53 |
| 8,046,108 B2 * | 10/2011 | Hench | ............ | F03B 13/20 700/286 |
| 8,269,365 B2 * | 9/2012 | Clement | ............ | F03B 13/20 290/1 R |
| 9,121,394 B2 * | 9/2015 | Bachmann | ............ | F03G 7/08 |
| 9,617,972 B1 * | 4/2017 | Skaf | ............ | F03B 13/20 |
| 2004/0266278 A1 * | 12/2004 | Borgen | ............ | B63H 1/36 440/15 |
| 2007/0138793 A1 * | 6/2007 | Zimmerman | ............ | F03G 7/08 290/1 R |
| 2007/0251230 A1 * | 11/2007 | Zimmerman | ............ | F03G 3/06 60/497 |
| 2008/0093858 A1 * | 4/2008 | Hench | ............ | F03B 13/20 290/53 |
| 2009/0008942 A1 * | 1/2009 | Clement | ............ | F03B 13/20 60/497 |
| 2009/0085530 A1 * | 4/2009 | Matsubara | ............ | F03G 5/06 290/1 R |
| 2009/0127856 A1 * | 5/2009 | Hench | ............ | F03B 13/20 700/286 |
| 2009/0200983 A1 * | 8/2009 | Dyer | ............ | H02K 7/1876 320/107 |
| 2010/0123313 A1 * | 5/2010 | Hobdy | ............ | F03G 7/08 290/42 |
| 2010/0228401 A1 * | 9/2010 | Hench | ............ | F03B 13/20 700/287 |
| 2010/0319340 A1 * | 12/2010 | Wickett | ............ | F03B 13/182 74/731.1 |
| 2011/0042954 A1 * | 2/2011 | Werjefelt | ............ | F03B 13/20 290/53 |
| 2011/0193350 A1 * | 8/2011 | Rastegar | ............ | H02K 7/1876 290/1 R |
| 2014/0202146 A1 | 7/2014 | Hagemann et al. | | |
| 2015/0107239 A1 * | 4/2015 | Beane | ............ | F03B 13/182 60/505 |
| 2016/0276915 A1 * | 9/2016 | Oonishi | ............ | H02K 7/116 |
| 2017/0069823 A1 * | 3/2017 | Karpelson | ............ | H02K 1/2798 |
| 2021/0285415 A1 * | 9/2021 | Vamvas | ............ | B63B 35/44 |
| 2023/0167797 A1 * | 6/2023 | Vamvas | ............ | B63B 35/44 290/53 |
| 2023/0407834 A1 * | 12/2023 | Polesel | ............ | F03B 17/025 |

* cited by examiner

OCEAN WAVE ENERGY HARVESTING SYSTEM

TECHNICAL FIELD

The invention lies in the field of ocean energy harvesters. More precisely, the invention lies in the field of floating systems for producing electric power by conversion of mechanical energy from waves into electric power.

BACKGROUND OF THE INVENTION

The oceans and the seas are considered as infinite sources of green energy. They exhibit water flows due to tides, which are adapted for activating water turbines. In addition, their waves are convenient for feeding energy harvesters at the water surface. For instance, a wave energy harvester may align a horizontal set of floating bodies. The floating bodies pivot with respect to each other when a wave runs along the aligned set on the water surface. Electric generators make use the inclination differences between the adjacent floating bodies for producing electric energy continuously. This electric energy is used in situ, stored, or injected into a power network. Yet, this technology requires a long free surface. It also presents moving parts exposed to the salty and corrosive environment.

As an alternative, a wave harvester comprises a pivoting arm coupled to the electric generator. However, such an electric generator comprises a cogging torque hindering the motions of the arm, and thereby reducing energy output since the pendulum kinematic of the arm is blocked. Last but not least, the rotation speed of the arm is slow.

Technical Problem to be Solved

It is an objective of the invention to present a system, which overcomes at least some of the disadvantages of the prior art. In particular, it is an objective of the invention to present a system which improves electric power production from sea waves.

SUMMARY OF THE INVENTION

In accordance with an aspect of the invention, a system configured for producing electric power from waves, such as sea waves, is provided. The system comprises a buoyant body comprising a watertight enclosure in which the following are arranged:
an electric generator including an input shaft adapted to rotate with respect to the buoyant body;
a first arm coupled to the electric generator; a second arm; a pivot joint rotatably joining the second arm to the first arm, said pivot joint being linked to the electric generator by the first arm.

The system may preferably extend along a principal axis. The buoyant body may preferably comprise an equilibrium orientation, the input shaft may preferably comprise a first rotation axis, the pivot joint may preferably comprise a second rotation axis. The rotation axes extend substantially in parallel to the principal axis; and the arms extend substantially perpendicularly to the principal axis.

Preferably, the system may extends along a principal axis. The buoyant body may preferably comprise an equilibrium orientation, the input shaft may preferably comprise a first rotation axis, the pivot joint may preferably comprise a second rotation axis. The rotation axes extend substantially perpendicularly to the principal axis; and the arms extend substantially in parallel to the principal axis.

According to another aspect of the invention it is provided a system configured for producing electric power from waves, such as sea waves; the system comprising: a buoyant body; an electric generator including an input shaft adapted to rotate with respect to the buoyant body; a first arm coupled to the electric generator; a second arm; a pivot joint rotatably joining the second arm to the first arm, said pivot joint being at distance, along the first arm, from the input shaft; and/or said pivot joint being linked to the electric generator by the first arm; and/or the second arm is linked to the generator by the first arm.

Preferably, the buoyant body comprises an equilibrium orientation, the input shaft comprises a first rotation axis, the pivot joint comprises a second rotation axis, said rotation axes being vertical; and wherein the arms are horizontal.

Preferably the buoyant body may extend along a principal axis.

Preferably, the buoyant body may comprise an equilibrium orientation, the input shaft may comprise a first rotation axis, the pivot joint may comprise a second rotation axis, said rotation axes may be horizontal, that is, extending substantially perpendicularly to the body's principal axis; and wherein the arms are vertical, that is, substantially parallel to the body's principal axis.

Preferably, the first arm may comprise a first length L1, and the second arm may comprise a second length L2 which may be smaller than the first length L1.

Preferably, the length ratio L1/L2 may range: from 1 to 5; or from 2 to 3.

Preferably, the first arm comprises a first weight W1, and the second arm comprises a second weight W2 which may be heavier than the first weight W1.

Preferably, the weight ratio W2/W1 may range from: 0.8 to 5.

Preferably, the system comprises an overall weight Wo, the ratio Wo/(W1+W2) may range from 2 to 6.

Preferably, the inertia ratio $\phi$ of the weight ratio $\delta$/length ratio $\mu$ may range from 1 to 4, preferably from 2 to 3.

Preferably, the first arm may have a first length L1 and a first weight W1, the second arm may have a second, smaller length L2 and a second, heavier weight W2, wherein an inertia ratio $\phi$, being the weight ratio (W2/W1) divided by the length ratio (L1/L2) may range from 1 to 4, preferably from 2 to 3.

Preferably, along the first arm, said first arm may comprise a first weight block at the pivot joint, and/or along the second arm, said second arm may comprise a second weight block at the opposite of the pivot joint.

Preferably, the electric generator may comprise an inner rotor and a gearbox coupling the first arm to the inner rotor, said gearbox may comprise a multiplication ratio of at least 30.

Preferably, the system may comprise a vertical axis such as and/or a main or principal axis, and means configured for reducing rotation of the buoyant body about the vertical axis and/or about the main axis.

The system may preferably comprise a principal axis and means configured for reducing rotation of the buoyant body about the principal axis.

Preferably, the system may comprise means; such as a counter weight, or a ballast, or fixation means; which may be configured for orienting the buoyant body in a predefined orientation, notably with respect to a wave surface.

Preferably, the system may comprise a flotation line, the arms may be above said flotation line.

The system (2) in accordance with any of claims 1 to 13, wherein the system (2) comprises a flotation line (14), the arms (30; 32) being arranged above said flotation line (14) along a main axis (8) of the system.

Preferably, the system comprises a gravity centre, at least one of the first arm and the second arm may be vertically at distance from said gravity centre.

The system may preferably comprise a gravity centre, at least one of the first arm and the second arm being arranged at a distance from said gravity centre along a main or principal axis of the system.

Preferably, the electric generator may comprise a rotating link rotatably coupling the input shaft to the buoyant body, said rotating link may comprise a damping coefficient of at least 0.016 Ns/m.

Preferably, the electric generator may comprise a gearbox with a multiplication factor of at least and may comprise a cogging torque of at least: 10 mN·m; preferably 24 mN·m.

Preferably, the body may comprise a watertight enclosure in which the arms are arranged.

Preferably, the second arm may be a free arm, and may comprise a free end which is free to rotate independently of the generator.

Preferably, the rotation axes may be mutually parallel.

Preferably, the arms may be connected and restricted in the same plane for moving and/or the arms may be mutually parallel, and/or the arms may be configured for moving in parallel planes.

Preferably, the electric generator may be configured such that the rotation of the input shaft causes the electric generator to generate electric energy.

Preferably, the main body may comprise an outer diameter of 40 cm, and/or a weight ranging from: 1 kg to 10 kg, or 1 kg to 5 kg.

Preferably, the system may comprise a lower half and an upper half, the arms may be arranged in the upper half.

Preferably, the system may comprise an inertia about a vertical pivot axis.

Preferably, the antenna may be arranged above the electric generator; and/or at an upper half of the buoyant body.

The input shaft is not an essential aspect of the invention.

It is another aspect of the invention to provide an energy recovery system comprising:
  a floating body;
  optional means configured for defining an equilibrium orientation of the system, notably the floating body, said means optionally comprising a counterweight;
  a vertical direction;
  an electric generator;
  a first rotation axis;
  a first arm coupled to the electric generator;
  a second rotation axis coupling the first arm to the second arm;
  a second arm being attached to the first arm at the second rotation axis which is offset from the first rotation axis, optionally with a free end at distance from the first arm.

It is another aspect of the invention to provide a system configured for producing electric power with wave energy, the system comprising:
  a buoyant body
  an electric generator including a rotating shaft;
  a first arm attached to the to the input shaft, for instance directly or indirectly;
  a second arm rotatably attached to the first arm;
  the first arm comprising a pivot joint attached the second arm, said pivot joint being at distance from the rotating shaft.

It is another aspect of the invention to provide a system configured for converting wave energy into electric energy, the system notably being an energy converter adapted to convert mechanical energy into electrical energy, the system comprising:
  a floating body;
  preferably a counter weight defining an equilibrium orientation of the system, respectively the floating body;
  an electric generator including an input shaft with a first rotation axis;
  an articulated chain with at least two segments,
  said articulated chain comprising a first end attached to the input shaft and/or at the first rotation axis, and a second end which is a free end at the opposite of the first end.

It is another aspect of the invention to provide a system configured for wave energy recovery, the system comprising:
  a buoyant body
  a counter weight defining an equilibrium orientation of the system/body;
  an electrical generator including a first rotation axis;
  a crank attached to the to the input shaft;
  a second rotation axis;
  a rocker rotatably attached to the crank at the second rotation axis, the crank optionally forming a first arm and the rocker optionally forms a second arm.

It is another aspect of the invention to provide a system configured for producing electric power from waves, such as sea waves; the system comprising:
  a buoyant body;
  an electric generator including a cogging torque and an input shaft adapted to rotate with respect to the buoyant body;
  a pair of connected arms which are configured for overcoming the cogging torque of the electric generator by means of the sea wave; optionally with chaotic trajectories of the arms.

It is another aspect of the invention to provide autonomous floating analysis station comprising a system in accordance with the invention, the autonomous floating analysis station preferably comprising a water passage below the first arm and the second arm.

In accordance with a further aspect of the invention, an autonomous floating analysis station is provided. The station comprises a system in accordance with aspects of the invention. The autonomous floating analysis station preferably comprises a water passage arranged closer to the immersible end of the system along a principal axis thereof, than the first arm and the second arm.

Preferably, the system comprises a communication module including an antenna above the arms.

The system may preferably comprise a communication module including an antenna arranged further from the immersible end of the system along a principal axis thereof, than the arms.

It is another aspect of the invention to provide an energy production process with a system which comprises a buoyant body, an electric generator with an input shaft, a first arm, a second arm pivotably coupled to the first arm; the energy generation process comprising the following steps: orienting the buoyant body in accordance with a first orientation in water, notably in wavy water; leaning the buoyant body with respect to the first orientation; moving the second arm with respect to the buoyant body; transmitting the motion of the second arm to the electric generator through a rotation of the first arm in order to generate electric energy; the system preferably being in accordance with the invention.

Preferably, at the step of transmitting, the second rotation speed of the second arm with respect to the first arm may be higher than the first rotation speed of the first arm with respect to the buoyant body.

Preferably, at the step of transmitting, the second rotation acceleration of the second arm with respect to the first arm may be higher than the first rotation acceleration of the first arm with respect to the buoyant body.

Preferably, at the step of leaning, the buoyant body may be inclined of at least 8°, preferably with respect to the vertical direction or the equilibrium orientation.

Preferably, the step of leaning may comprise a wave frequency ranging from 0.1 Hz to 1 Hz.

Preferably, at the step of transmitting, the second rotation speed of the second arm with respect to the buoyant body may be higher than the first rotation speed of the first arm with respect to the buoyant body.

Preferably, at the step of transmitting, the second rotation acceleration of the second arm with respect to the buoyant body may be higher than the first rotation acceleration of the first arm with respect to the buoyant body.

Preferably, the rotation speeds may be maximum rotation speeds or average rotation speeds.

Preferably, the rotation accelerations may be maximum rotation accelerations or average rotation accelerations.

It is another aspect of the invention to provide a use of two arms pivotably joined in series in order to activate an electric generator including a gearbox and or with an input shaft of a system with a buoyant body, said system being configured for producing electric energy with wave energy; the system preferably being in accordance with aspects of the invention.

It is another aspect of the invention to provide a use of two arms pivotably joined in series in order to activate an electric generator with an input shaft of a system with a buoyant body, said system being configured for producing electric energy with wave energy; the system preferably being in accordance with aspects of the invention.

The different aspects of the invention may be combined to each other. In addition, the preferable features of each aspect of the invention may be combined with the other aspects of the invention, unless the contrary is explicitly mentioned.

Technical Advantages of the Invention

The invention provides a specific combination of dependent arms which move, which oscillate, with small waves. The configuration in accordance with the invention increases rotation speeds and rotation accelerations of the arms, and notably of the power converter. Thus, electric power production is increased as compared to known systems. The proposed system is more efficient for converting the kinetic energy of sea waves into usable electric power. As none of the components that actuate the generator, or that actually generate power, come into contact with seawater during operation, corrosion is limited and the need for maintenance is reduced. This is especially useful when the device is deployed on open seas.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

This section describes aspects of the invention in further detail based on preferred embodiments and on the figures, without limiting the invention to the illustrated examples. Similar reference numbers will be used to describe similar or the same concepts throughout different embodiments of the invention.

In the current description, a cogging torque may be considered as a torque resulting from the electromagnetic interaction between permanent magnets of the rotor and the stator slots of the electric generator, which may generally be considered as an electric machine.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the system in accordance with the invention may comprise a computer unit, even though such computer is not explicitly referenced on the figures nor referenced in the description.

The terms "horizontal" and "vertical" should not be interpreted in a strict manner in connection with the system. Indeed, the system tilts by nature, and presents a pitch angle and a roll angle driven by the waves. Thus, a tolerance corresponding to the inclination of the system should be adopted when interpreting the terms "horizontal" and "vertical". The "horizontal" orientation generally refers to an orientation that is substantially parallel to the local water surface, whereas "vertical" refers to an orientation that is substantially perpendicular thereto.

Figure 1:
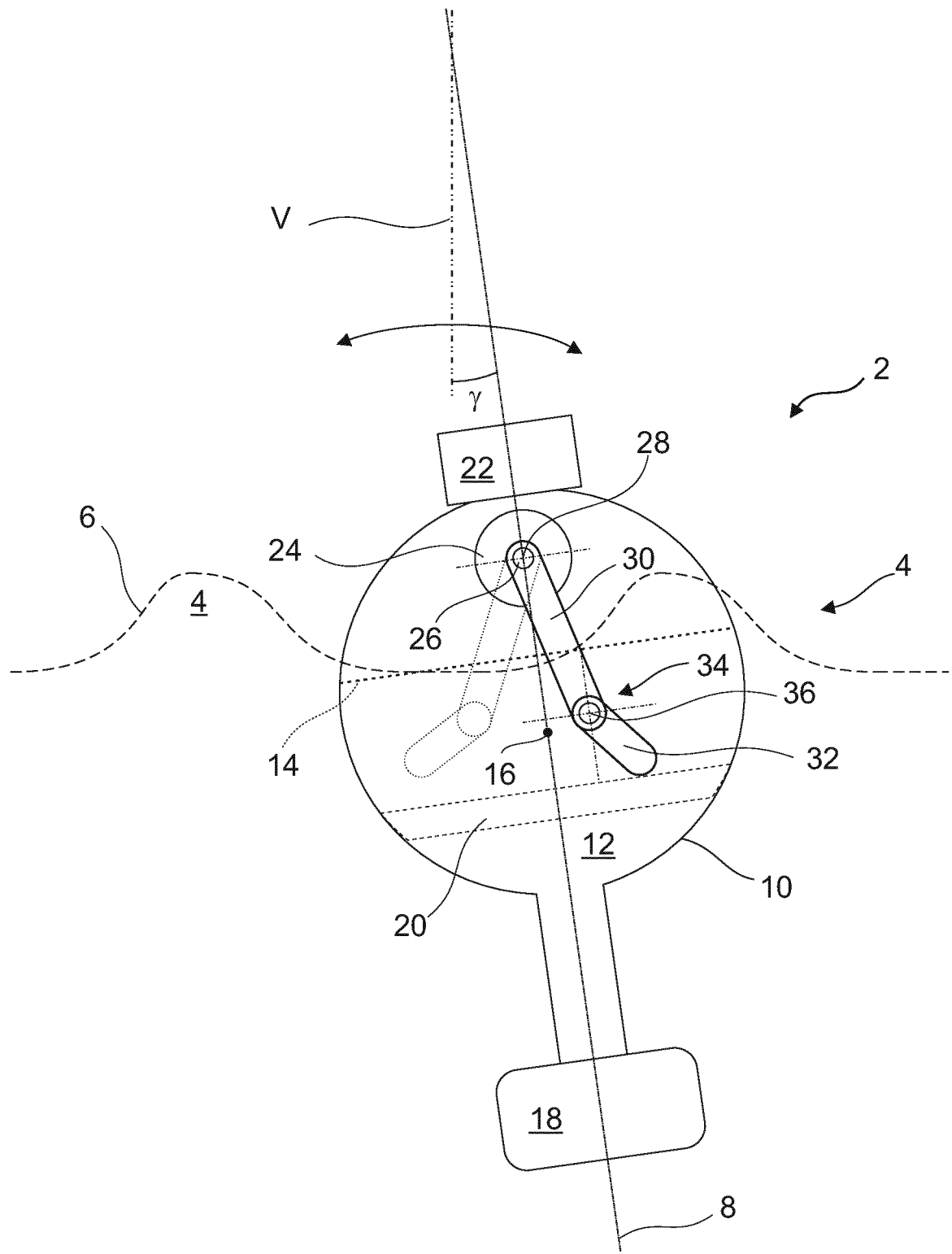
FIG. 1 provides a schematic illustration of a lateral cut view of a system in accordance with a preferred embodiment of the invention.

FIG. 1 shows a system 2 in accordance with a preferred embodiment of the invention. The system 2 is adapted for producing electric power by means of waves 4 in a maritime environment.

The system 2 is a floating system, which crosses the water surface 6. The waves 4 generate inclination variation at the water surface 6, and move with respect to the system 2. The wind increases the wave amplitude, and sharpen their profiles. Since the system 2 is a buoyant one, it is lifted by the waves 4 when they sweep it. Due to their shapes and motions, the waves 4 destabilize the system 2 and cause it to move, to tilt with respect to the vertical direction V, also designated as vertical axis V.

The inclination of the system 2 is measured between the vertical axis V and a main or principal axis 8 of the system 2. The main axis 8 is parallel to the vertical axis V when the water surface 6 is flat, namely free of waves. Then, the system 2 is in an equilibrium orientation. The main axis 8 may extend along the longest dimension of the system 2. In the illustrated embodiment, the main axis extends along the height of the system. The main axis extends from a top end to a bottom end, wherein the bottom end is the immersible end of the system, which is immersed in water when the system floats on a water surface. In what follows, when it is stated that feature X is "lower" than feature Y, this means that feature X is arranged at a smaller distance from the immersible end of the system, than feature Y.

An inclination angle $\gamma$ defines the inclination of the system 2 with respect to its environment. The inclination angle $\gamma$ is between the vertical axis V and the main axis 8. In the current illustration, the inclination angle $\gamma$ set to 8°. The inclination angle $\gamma$ is a combination of the pitch angle $\alpha$ and the roll angle R (not represented).

The system 2 exhibits a buoyant body 10. The buoyant body 10 may define an enclosure 12. The enclosure 12 is watertight, and ensures the ability of the system 2 to stay at the water surface 6. It further protects the components of the system 2 from the corrosive seawater environment, when in use. The body may define the waterline 14 of the system 2. The waterline 14 may also be designated as floating line 14. It may also be connected to the position of the gravity centre 16 of the system 2.

It will be understood by those skilled in the art that the equipment of the system 2 has an influence on the waterline 14 and the gravity centre 16.

The system 2 may comprise means for orienting it in a predefined and privileged orientation when the system 2 is floating. Said means may be equilibrium means. This orientation or reference orientation may be a vertical orientation, when the vertical axis V and the main axis 8 are parallel. By way of illustration, the equilibrium means comprise a ballast 18 under the buoyant body 10. As an alternative, the equilibrium means comprise a counter weight 18 in the buoyant body 10, notably in its lower half, preferably at its bottom. These solutions are convenient in light of ocean's tides. As a further alternative, the equilibrium means may comprise fixation means which are intended to be fixed to a rope attached a fix point of the environment. The fixation means may comprise a fixation hole.

As an option, the system 2 comprises a water passage 20. The water passage 20 may form a channel, or through-hole, in the buoyant body 10, which is thereby adapted to collect a water sample. The water passage 20 may be a through passage across the system 2. It is preferably arranged below the waterline 14 along the principal axis of the system. Then water analysis may be performed. Water pollution may be detected. Specific particles may be observed. Some biological species may be observed.

As another option, the system 2 comprises communication means, for instance for emitting data related to the water analysed in the water passage 20, the status of the water surface 6 movements (calm sea or choppy sea) and/or the geolocation of the system 2. The water status may be provided through an embedded accelerometer module and/or a gyroscope module. The communication means may comprise an antenna 22. The antenna 22 may be on top of the buoyant body 10. The antenna 22 may form the summit of the system 2. The communication means may comprise a wireless communication module and a microcontroller associated with the antenna 22.

The system in accordance with the invention may be integrated in a floating station for water analysis. The station may be an autonomous floating analysis station.

The station is adapted for different kinds of analysis, such as pollutant objects detection in water, status of the sea waves. The wave status includes the intensity of the movements of the waves by the means of an accelerometer and/or a gyroscope. The station may further comprise a location module for providing a location signal of the buoy in the sea. The location signal may be computed by means of at least one of the following: a magnetometer module, a compass module, a GPS signal and combination thereof.

In order to offer energy, the system 2 comprises an electric generator 24. The electric generator 24 is arranged in the buoyant body 10, notably in the enclosure 12. The electric generator 24 may be a rotating generator. It notably comprises an input shaft 26 rotating about a first rotation axis 28. When the input shaft 26 turns about the first rotation axis 28, the electric generator 24 generates electric power. The electric generator 24 may comprise a stator and a rotor. The latter may be equipped with coils and permanent magnets respectively. The resulting rotating electric machine may present counter electric forces. The rotor is coupled to the input shaft 26, directly or indirectly. In addition, the system 2 is equipped with a pair of arms 30 and 32 within the enclosure 12. The arms (30; 32) are arranged in series. The arms are represented in different configurations: a first configuration is provided in solid line, and a second configuration is provided with dashed lines. When the system 2 swings under the wave effect, the arms pivot with respect to the buoyant body 10, and also with respect to each other due to their respective inertias. The arms 30 and 32 are elongated elements. The arms are inertia means. They may form levers. They may be mechanical links.

The arms comprise a first arm 30 attached to the input shaft 26, and a second arm 32 attached to the first arm 30. A rotation of the first arm 30 about the rotation axis 28 causes the electric generator 24 to produce electric power. A pivot joint 34 rotatably connects the arms 30 and 32 together. Thus, motions and mechanical forces of the second arm 32 are transmitted to the input shaft 26 through the first arm 30. The motions of the second arm 32 increase the rotation angle of the first arm 30, which increases the converted energy. These motions also increase the rotation accelerations of the first arm 30 about the input shaft 26. The first arm 30 may be considered as a primary arm as it is coupled to the generator, whereas the second arm may be considered as an auxiliary arm due to its freedom.

The pivot joint 34 comprises a second rotation axis 36. The second rotation axis 36 may be parallel to the first rotation axis 28, and at distance from the latter. The rotation axes 28 and 36 are offset. The first and second rotation axes 28 and 36 may be perpendicular to the main axis 8 of the system 2. These rotations axes 28 and 36 are generally horizontal. The arms are transversal, preferably perpendicular to the rotation axes 28 and 36. The first arm 30 extends at least from the first rotation axis 28 to the second rotation axis 36.

The electric generator 24 may comprise a gearing (not represented), also designated as gear box. The gearing may be smaller than the magnetic portion and/or the electric portion of the generator 24. The input shaft 26 may form the input of the gearbox. The gearing may comprise a multiplication ratio of at least: 10, or 30, or 50, or 110, or 150. The gearbox may be coupled to the inner rotor, notably with magnets, of the electric generator 24. Thus, the rotation angle of the rotor is multiplied with respect to the rotation angle of the first arm 30. More electric power is generated. The electric generator 24 may be subjected to cogging torque. The second arm 32, due to the water swell, moves in a chaotic fashion. Then, it communicates torque peaks to the electric generator 24 through the first arm 30. Then, it becomes easier to overcome the cogging torque, which is optionally multiplied by the gearbox. Then, a smaller wave allows the second arm 32 to activate the electric generator 24. Waves defining a small undulation on the surface, or triggering a reduced inclination angle γ, still manage to activate the electric generator 24 due to the second arm's potential. Hence, the system 2 is adapted to produce electric power in more wave configurations. The system 2 is more efficient. It remains electrically autonomous for extended periods: for months or years. The electric battery management becomes easier.

The first arm 30 is longer than the second arm 32, for instance two times longer. As an option, the second arm 32 is heavier than the first arm 30, for instance at least: two times or three times heavier. A short and heavy second arm 32 increases its ability to rock and to generate a sudden effort on the first arm 30. Then, it is statically easier to overcome the intrinsic cogging torque of the electric generator 24. The second arm configuration also increases the rotation speed and the rotation acceleration of the input shaft 26.

As an option, the system is coupled with an offshore wind turbine (not represented). The system may form the floating base of the wind turbine, thereby combining two energy production solutions.

As another option, the system is coupled with a solar panel (not represented). The top of the system may form the floating base of the solar panel installation which is exposed to the sun, thereby combining two energy production solutions.

A 10 cm*10 cm solar panel may be used. The wave energy source and the sun energy source offer the same electric power level: about 100 mW. These energy sources provide energy level which are in the same order of magnitude, with the advantage of the electromagnetic generator of the double pendulum to work along the whole day; in peculiar during the night since the movements of waves is continuous.

Figure 2:
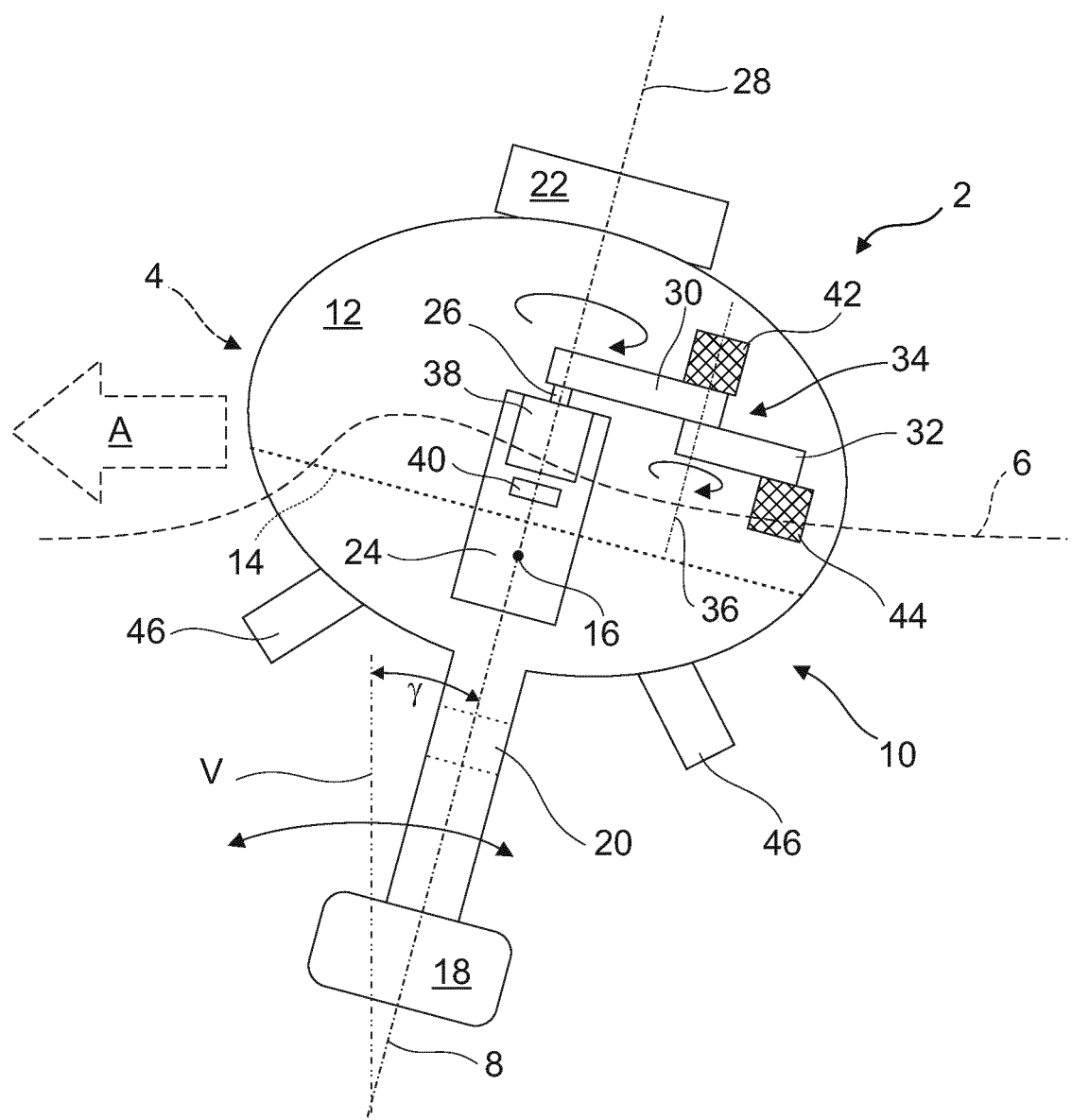
FIG. 2 provides a schematic illustration of a lateral cut view of a system in accordance with a preferred embodiment of the invention.

FIG. 2 represents a system 2 for generating electric power in a choppy sea in accordance with another embodiment of the invention. The current system 2 is substantially similar to the one described in relation with FIG. 1, however it differs in that the rotation axes 28 and 36 are vertical. While the embodiment of FIG. 2 differs from the embodiment in FIG. 1, the same reference numbers will be used to refer to features that are similar in both embodiments. The differences between the arrangements in both embodiments are explained here below.

The system 2 is depicted as floating at the water surface 6. In use, it swings from left to right, from front to back due to the propagation of a wave 4 moving at the liquid surface. The wave 4 may present an asymmetric profile which influences the motion of the system 2. It is understood that the system 2 tilts in one direction and in the opposite direction when a wave crosses it. After a wave passage, the system 2 may continue oscillating, swinging, for instance until the next wave will excite it. As an option, the wave may be taller than the system 2.

The system 2 is adapted for waves 4 of different heights, different curvatures, different slopes, different speeds of propagation. The wave 4 may be formed by the wind. The wave 4 may be partially formed by gravity force variations. The wave may present a frequency ranging from 0.05 Hz to 1.2 Hz, or from 0.1 Hz to 1 Hz. The orientation of the system 2 changes when it meets the wave 4. Then, the orientation variation of the system 2 also presents a frequency ranging from 0.05 Hz to 1.2 Hz, or from 0.1 Hz to 1 Hz.

In addition, the floating line 14, or waterline 14, also moves up and down when the wave approaches. This vertical motion may influence the energy production, notably when the rotation axes 28 and 36 are tilted with respect to the vertical axis V. The vertical motion is also observed through the gravity centre 16.

The arms 30 and 32 are arranged within the watertight enclosure 12 and at distance from the waterline 14, so that their position is above the water surface when the system is in use. The arms (30; 32) are located above the waterline 14. There, the tilting motions of the system 2 are amplified. When the system 2 leans from the inclination angle γ, the motion impulse observed at the arms (30; 32) is amplified. More electric power is available. The distance with respect to the gravity centre 16 has also an impact on the motion amplification when the system 2 pivots and oscillates.

The equilibrium means, notably the ballast 18, have an opposite action than the wave 4 on the inclination angle γ. The wave 4 leans the system 2 and increases the inclination angle γ whereas the orientation means force the main axis 8 to be parallel to the vertical axis V, along the gravity force vector. The wave 4 provokes an unbalanced configuration while the equilibrium means impose a balanced state, or stable orientation. In the current illustration, the inclination angle γ reaches 15°. The represented inclination angle γ may correspond to a maximum inclination of the system 2 due to the wave 4 motion.

The enclosure 12 is arranged between the ballast 18 and the communication means, notably the antenna 22. The ballast 18 and the antenna 22 are vertically at opposite ends of the system 2, along its principal axis. The water passage 20 may be at a connection between the buoyant body 10 and the orientation means 18. It may be vertically at distance from the enclosure 12.

The enclosure 12 houses the electric generator 24, the first arm 30 and the second arm 32. The electric generator 24 comprises a vertical rotation axis 28 about which its rotor turns. The shaft 26, also designated as rotating shaft 26, also turns about the vertical rotation axis 28. The shaft 26 may be considered an input shaft as it forms a mechanical input though which mechanical energy is fed in order to convert it in electric power.

The electric generator 24 may be an electromagnetic generator. As an alternative, the electric generator is an electromagnetic generator such as a dynamo. As a further alternative, the electric generator is an electrostatic generator, such as a triboelectric generator, a piezoelectric generator, or electret generator. Other electric generators are considered.

The first arm 30 is coupled to the electric generator 24 directly, or indirectly though the gearing means. The gearing means may equip the electric generator 24. The gearing means, notably the gearbox 38, may comprise a multiplication ratio of at least: 5, or 15, or 30, or 60, or 110, or 150. The multiplication means increase the rotation speed of the generator rotor with respect to the first arm 30. It also increases the torque, such as the cogging torque of the electric generator 24 which applies to the first arm 30 and to the input shaft 26. The cogging torque may result from magnetic means within the electric generator 24. At low speed, the first arm 30 may show jerky motions.

The first and second rotation axes 28 and 36 may be parallel to the main axis 8 of the system 2. The first arm 30 is essentially perpendicular to the first rotation axis 28. The second rotation axis 36, at the interface between the first and second arm, is perpendicular to the latter. Then, the arms (30; 32) pivot and sweep parallel planes which are perpendicular to the main axis 8. These planes are substantially horizontal. Thus, the system 2 is adapted for producing power independently from the system orientation with respect to the wave run direction represented by arrow A. The system is configured for generating electric power with waves, independently where they come from.

In the current illustration, the first arm 30 which is attached to the shaft 26 is above and over the second arm 32. The pivot joint 34 may be a hinged connection. As an alternative, the second arm 32 may be vertically level with the first arm 30. It may be within the vertical thickness of the first arm 30 instead of being stacked. As a further alternative, the second arm may be above the first one.

The electric generator 24 may comprise a rotating link 40 such as a ball bearing. The rotating link rotatably connects the input shaft 26 to the buoyant body 10. The rotating link 40 comprises a damping coefficient of at least 0.016 Ns/m. This coefficient reduces the power generation. The second arm 32 speeds up the first arm 30 in order to overcome the effect of the damping coefficient of the rotating link 40.

When the system 2 tilts with respect to the vertical equilibrium orientation, the arms 30 and 32 move due to their weights and gravity. In order to increase the produced electric energy, the arms are provided with additional masses for providing specific additional weights. The weights may be weight blocks, or weigh elements. The first arm 30 includes a first weight block 42, and the second arm 32 includes a second weight block 44, which are at distance from each other. The second arm 32 ensures a distance between the weight blocks 42 and 44.

The first arm 30 comprises a first weight W1, also designated as first mass M1; and the second arm comprises a second weight W2, also designated as second mass M2. The ratio W2/W1, or weight ratio δ, ranges from: 0.5 to 10, preferably from 0.8 to 5. As an option, the second weight block 44 is heavier than the first weight block 42. The addition of the first weight W1 and of the second weight W2 represents at most the half of the overall weight Wo of the system 2. The ratio {Wo/(W1+W2)} may range from: 2 to 10, or 2 to 6. Then, the cumulative weight of the arms represents a minor portion of the system's weight. The orientation of the arms, and their motions, have limited impacts on the general equilibrium and the system's orientation. Accordingly, the arm configuration does not degrade the power generation.

The first weight block 42 may be at one end of the first arm 30, for instance at the opposite of the first rotation axis 28 and the shaft 26. The first weight block 42 may be at the second rotation axis 36. It may cover the second arm 32. It may extend along the latter. Then the first weight block 42 increases the inertia of the first arm 30 with respect to the first rotation axis 28. The first weight block 42 may be at the pivot joint 34.

The second weight block 44 may be at a free end of the second arm 32. The weight blocks 42 and 44 may be at opposite ends of the second arm 32. The second arm 32 forms a link which extends, at least, between the first and second weight block (42; 44). The second weight block 44 increases the inertia of the second arm 32, as defined with respect to the second rotation axis 36.

Due to the multiplication coefficient of the gearbox 38, the cogging torque maintaining the first arm 30 with respect to the electric generator 24 is of at least: 4 mN·m; or 20 mN·m; or 24 mN·m; or mN·m; or 40 mN·m; or 80 mN·m; or 150 mN·m. Thus, this multiplied cogging torque prevents motions of the first arm 30, and as a corollary, of the input shaft 26. This resulting cogging torque forms a hurdle to power generation. Then, the first arm 30 needs to exert a threshold torque greater than the cogging torque in order to activate the electric generator 24, and thereby to produce electric energy. The interest of the second arm 32 is precisely to boost the activation torque, by transmitting motion impulse.

The system 2 may comprise means 46 for limiting rotation about the main axis 8. The means may be orientation means 46, adapted for keeping the orientation of the system 2 about to the vertical axis V. The orientation means 46 may be distributed about the main axis 8. They may be diametrically opposed. The orientation means 46 may comprise fins 46 or wings in water. The fins 46 may form blades protruding from the buoyant body 10. The fins 46 extend in water and slow down the rotation of the system 2 as their surfaces oppose a reaction torque when the system 2 intends to spin about the vertical axis V. The orientation means 46 increase the stability, notably about the main axis 8, such that when a wave 4 moves the system 2, the arms' motions are fostered. Hence, more power is produced.

In addition, or as an alternative to a circular or spherical shape, the buoyant body 10 may comprise a polygonal shell. The buoyant body 10 may present a triangular or a square outline which refrains the system from spinning. The shell may be part of the orientation means 46. Other orientation means are considered.

As an alternative, the water passage is arranged at the floating line of the system. Then, the water passage eases particle detection at the water surface 6.

The system 2 in accordance with the invention may be combined with other modules for producing electric power. As an illustrative example, the system 2 is combined with a wind turbine. A second electric generator may be provided, specifically for the bladed rotor of the wind turbine. The wind turbine may be on top of the buoyant body. The buoyant body may form a floating base. The ballast may be useful for maintaining the vertical orientation of the wind turbine. When the wind blows, the waves raise and the wind turbine turns. Electric power output rises due to synergy triggered by the wind. Power peaks are observed.

As yet another illustrative example, the system is combined with solar cells. The solar cells offer electric power with the day light. The solar cells may be above the arms 30 and 32, for instance on top of the buoyant body.

Figure 3:
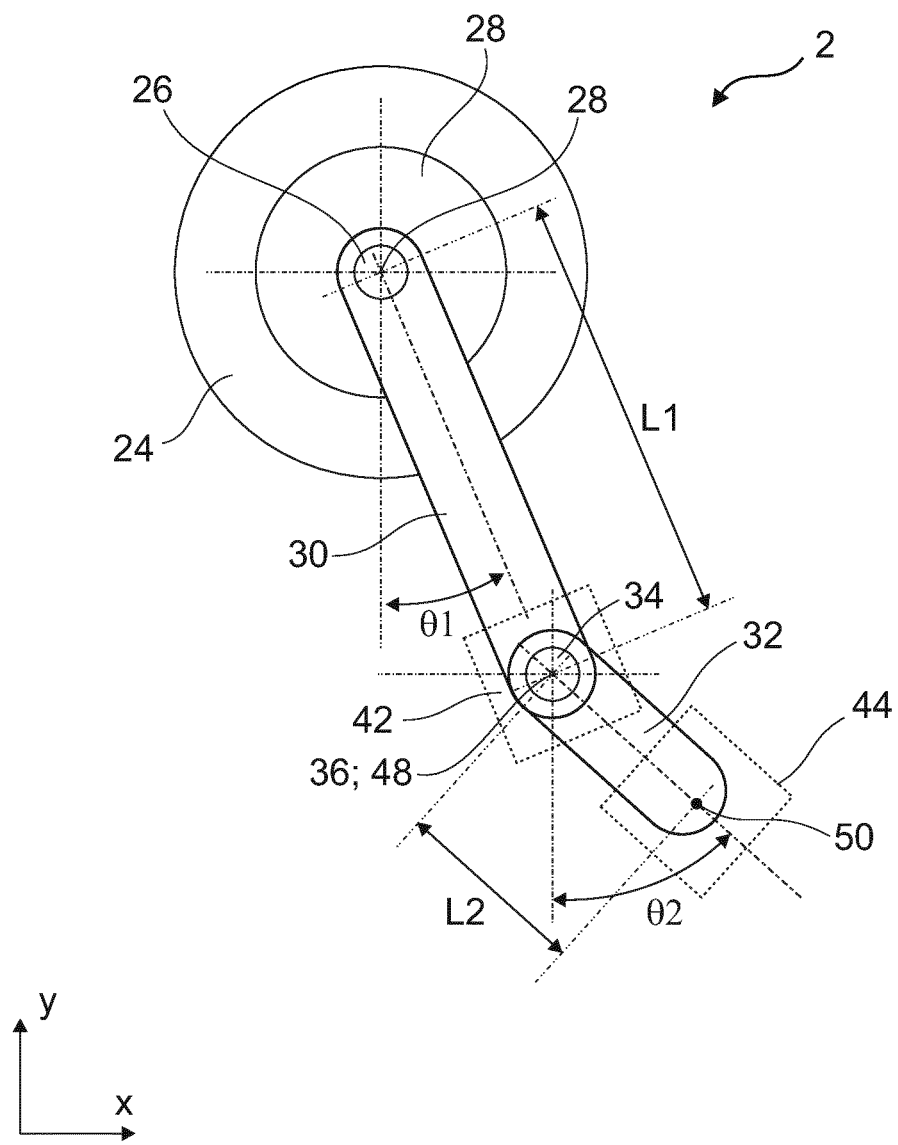
FIG. 3 provides a schematic illustration of a transversal cut top view of a system in accordance with a preferred embodiment of the invention.

FIG. 3 provides a schematic illustration of another embodiment of the system 2 for generating electric power in accordance with the invention. The current system 2 is substantially similar or identical to the ones described in relation FIGS. 1 and 2, so that the same reference numbers are used to denote similar concepts and features. The buoyant body is omitted for the sake of clarity.

The electric generator 24 is represented in the background. The system 2 with a pair of arms (30; 32) is also designated as a system with a double pendulum.

The first arm 30 comprises a first length L1. The first length L1 may correspond to the whole length of said arm, or may be measured from the shaft 26 to the pivot joint 34. The first length L1 may be defined as the distance between the first rotation axis 28 and the second rotation axis 36. The first length L1 may be the distance between the first rotation axis 28 and the first gravity centre 48 of the first weight block 42. In the current illustration, the first gravity centre 48 may be at the first rotation axis 28. The first rotation axis 28 may correspond to the rotation axis of the gearing 38. As an alternative, it may be offset in a top view along the axis 28.

The second arm 32 comprises a second length L2. The second length L2 may generally correspond to the whole length of the second arm 32. The second length L2 may be defined as the distance between the second rotation axis 36 and the gravity centre 50 of the second weight block 44.

As an option, it may be considered that the elongated and structural elements forming the arms present weights that are negligible in view of the own weights of the weight blocks (42, 44). Each arm may comprise a rod with a weight representing at most: 20%, or 10% or 5%, of the weight of the associated weight block (42, 44).

The μ ratio L1/L2, also designated as length ratio μ, may range from: 1 to 10, or 1 to 5, or 2 to 3. The second arm 32 is shorter than the first arm 30, for instance at least two times shorter.

As an option of the invention, the shortest arm is the heaviest. The inertia ratio φ, or ratio φ, of the weight ratio δ/length ratio μ ranges from: 1 to 10, or 1 to 4, or 2 to 3.

The behaviour of the double pendulum oscillating with two masses has also been the subject of a large number of studies in the state of the art [Cross, 2005]. This latter system has analytical solutions of trajectories that can be approximated by linear combinations at small amplitudes of oscillation. At large amplitudes of oscillation, this is no longer the case with the appearance of a chaotic behaviour of the pendulum movement. In this case, it is necessary to solve the equations of motion with a numerical resolution tool with step by step integration methods (Runge-Kutta. Verlet, . . . ).

Let us focus on the kinematics model of the damped double pendulum. In a (x, y) reference frame, using Newton's second law, we get the following equations:

$$M_1 \cdot \ddot{x}_1 = -T_1 \cdot \sin\theta_1 + T_2 \cdot \sin\theta_2 - \frac{c_1}{L_1} \cdot \dot{\theta}_1 \cdot \cos\theta_1 \quad \text{equation 1}$$

$$M_1 \cdot \ddot{y}_1 = T_1 \cdot \cos\theta_1 - T_2 \cdot \cos\theta_2 - M_1 \cdot g - \frac{c_1}{L_1} \cdot \dot{\theta}_1 \cdot \sin\theta_1 \quad \text{equation 2}$$

$$M_2 \cdot \ddot{x}_2 = -T_2 \cdot \sin\theta_2 - \frac{c_1}{L_1} \cdot (\dot{\theta}_2 - \dot{\theta}_1) \cdot \cos\theta_2 \quad \text{equation 3}$$

$$\text{and } M_2 \cdot \ddot{y}_2 = T_2 \cdot \cos\theta_2 - M_2 \cdot g - \frac{c_2}{L_2} \cdot (\dot{\theta}_2 - \dot{\theta}_1)\sin\theta_2 \quad \text{equation 4}$$

$T_i$ is the tension in the arm "i", and $c_i$ is the damping coefficient of the pivot point "i". $x_1$, $y_1$, $x_2$ and $y_2$ are the positions of respectively the first mass block and the second mass block Rearranging these equations, we obtain the coupled equations of motion of the damped double pendulum:
Equation 5:

$$(M1 + M2) \cdot (L1 \cdot \ddot{\theta}_1 + \sin\theta_1 \cdot g) +$$
$$M2 \cdot L2 \cdot \{\ddot{\theta}_2 \cdot \cos(\theta_1 - \theta_2) + \dot{\theta}_2^2 \cdot \sin(\theta_1 - \theta_2)\} =$$
$$-\frac{c_1}{L_1} \cdot \dot{\theta}_1 - \frac{c_2}{L_2} \cdot (\dot{\theta}_2 - \dot{\theta}_1) \cdot \cos(\theta_1 - \theta_2)$$

$$\text{and } M2 \cdot (L2 \cdot \ddot{\theta}_2 + \sin\theta_2 \cdot g) + M2 \cdot L1 \cdot \quad \text{equation 6}$$
$$\{\ddot{\theta}_1 \cdot \cos(\theta_1 - \theta_2) + \dot{\theta}_1^2 \cdot \sin(\theta_1 - \theta_2)\} = -\frac{c_2}{L_2} \cdot (\dot{\theta}_2 - \dot{\theta}_1)$$

These equations are then solvable numerically, after writing them as a system of coupled first order differential equations on the variables $\theta_1$, $\theta_2$, $\dot{\theta}1$ and $\dot{\theta}2$ and using an ordinary differential equation solver.

We can then add to equation 5 and equation 6 the angular perturbations that will mimic the ocean waves' curves. A simple model would be to take into account the pitch and roll perturbations of the waves only. By defining the pitch angle as α and the roll angle as β, the equations of motion of the perturbed damped double pendulum become:

$$(M1 + M2) \cdot (L1 \cdot \ddot{\theta}_1 + \{\sin\alpha \cdot \sin\theta_1 + \sin\beta \cdot \cos\theta_1\} \cdot g) + \quad \text{equation 7}$$
$$M2 \cdot L2 \cdot \{\ddot{\theta}_2 \cdot \cos(\theta_1 - \theta_2) + \dot{\theta}_2^2 \cdot \sin(\theta_1 - \theta_2)\} =$$
$$-\frac{c_1}{L_1} \cdot \dot{\theta}_1 - \frac{c_2}{L_2} \cdot (\dot{\theta}_2 - \dot{\theta}_1) \cdot \cos(\theta_1 - \theta_2)$$

$$\text{and } M2 \cdot (L2 \cdot \ddot{\theta}_2 + \{\sin\alpha \cdot \sin\theta_2 + \sin\beta \cdot \cos\theta_2\} \cdot g) + \quad \text{equation 8}$$
$$M2 \cdot L1 \cdot \{\ddot{\theta}_1 \cdot \cos(\theta_1 - \theta_2) + \dot{\theta}_1^2 \cdot \sin(\theta_1 - \theta_2)\} = -\frac{c_2}{L_2} \cdot (\dot{\theta}_2 - \dot{\theta}_1)$$

The moment of inertia for the double pendulum is defined as:

$$I = M1 \cdot L1^2 + M2 \cdot \{L1^2 + L2^2 + 2 \cdot L1 \cdot L2 \cdot \cos(\theta_1 - \theta_2)\} \quad \text{equation 9:}$$

Hence, the applied torque r on the central pivot θ1 about the first rotation axis, where the axis the electromagnetic generator is located, is proportional to the angular acceleration and it is expressed as:

$$\tau = I \cdot \ddot{\theta}_1 \quad \text{equation 10:}$$

A first numerical modelling of this equation based on these equations to find the angular position, velocity and acceleration is proposed for the simple pendulum and the double pendulum with the following parameters in masses and rod lengths such as:

Simple pendulum, with a single arm:

$W_1=1$ kg, $L_1=0.15$ m

Double pendulum:

$W_1=0.1$ kg, $W_2=0.9$ kg with $W_1+W_2=1$ kg, and $L_1+L_2=0.15$ m

The above equations are used for describing the behaviour of the system. In addition, these equations are used in order to compute accelerations, and electrical power generated.

Figure 4:
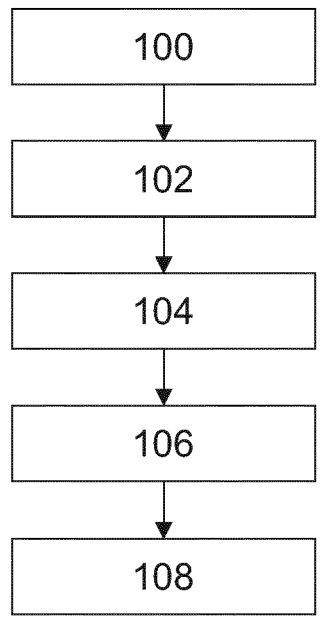
FIG. 4 provides a schematic illustration of a block diagram of an energy production process in accordance with a preferred embodiment of the invention.

FIG. 4 shows a diagram of a sea waves' energy conversion to electrical power conversion process, also designated as energy production process, in accordance with the invention. The energy conversion process involves a system for generating electric power, for instance as described in accordance with any of FIGS. 1 to 3, and combination(s) thereof.

The process comprises the following steps, notably executed as follows:
- orienting 100 the buoyant body of the system in accordance with a first orientation in water, notably in wavy water;
- leaning 102 the buoyant body with respect to the first orientation;
- moving 104 the second arm with respect to the buoyant body;
- transmitting 106 the motion of the second arm to the input shaft of the electric generator through a rotation of the first arm in order to generate electric energy;
- storing 108, or consuming, and injecting the electric power which is generated.

At the step of orienting 100, the buoyant body is put into the water. The system, notably the buoyant body, comprises a submerged portion and an emerged portion. Its main or principal axis may extend along the vertical axis. As an option, the system may be attached to the sea bed, or to a ship. As a further option, the system may be fixed to another system; said systems being similar or identical. A system in accordance with FIG. 1 may be attached to a system in accordance of FIG. 2. At the step of orienting 100, the water surface may be free of waves. During the process, the wave amplitude may change. The wave frequency may change as well. The frequency may become irregular.

At the step of leaning 102; a wave approaches, crosses, and moves away from the system. By comparison, it may be considered that the system is generally at a fixed location due to its inertia whereas the wave moves with respect to the environment; and notably with respect to the system.

Then, the wave pushes the system and generates an equilibrium change. The system moves sidewise; as represented in FIGS. 1 and 2.

At the step of leaning 102, the buoyant body is inclined of at least: 8°, or 15°, or 20°. The inclination angle of the buoyant body is measured with respect to the vertical direction and/or the equilibrium orientation.

In response to the side motion of the system, and due to its own inertia, the second arm moves at step moving 104. The equilibrium evolution and the gravity force urge the second arm to turn toward a lower position, in order to reach another equilibrium configuration.

At the step of transmitting 106, the electric generator generates electric power. The mechanical energy is converted in electric energy.

At the step of transmitting 106, the second rotation speed of the second arm with respect to the first arm is greater than the first rotation speed of the first arm with respect to the buoyant body. This second rotation speed is an average speed or a maximum speed.

At the step of transmitting 106, the second rotation acceleration of the second arm with respect to the first arm is greater than the first rotation acceleration of the first arm with respect to the buoyant body. At the step of transmitting 106, the second rotation acceleration of the second arm with respect to the buoyant body is higher than the first rotation acceleration of the first arm with respect to the buoyant body. The second rotation acceleration(s) is/are an average acceleration(s) or a maximum acceleration(s).

By way of illustration, at the step of transmitting 106, a system comprising a diameter of 40 cm and a weight of 3 kg is able to deliver a peak power of 100 mW. Thus, the system optimises compactness and the electric output. It is also convenient to manufacture.

It may be considered that the step of transmitting is a step of electric power generation; or a step of converting mechanical energy into electric power. Under other considerations, the process may comprise a step of generating electric power and/or a step of converting mechanical energy into electric power, for instance during or after said step of transmitting.

During the step of leaning 102, and at the step of transmitting 106, the waves comprises a wave frequency ranging from 0.1 Hz to 1 Hz. This frequency range is essentially broad, which promotes the ability of the system to produce electric power in different configurations, in different sea conditions. The probability to produce electric energy is increased in realistic operating conditions.

The system in accordance with the invention is also adapted to wave frequency and wave amplitude variations. The system produces power with heterogeneous waves.

Figure 5:
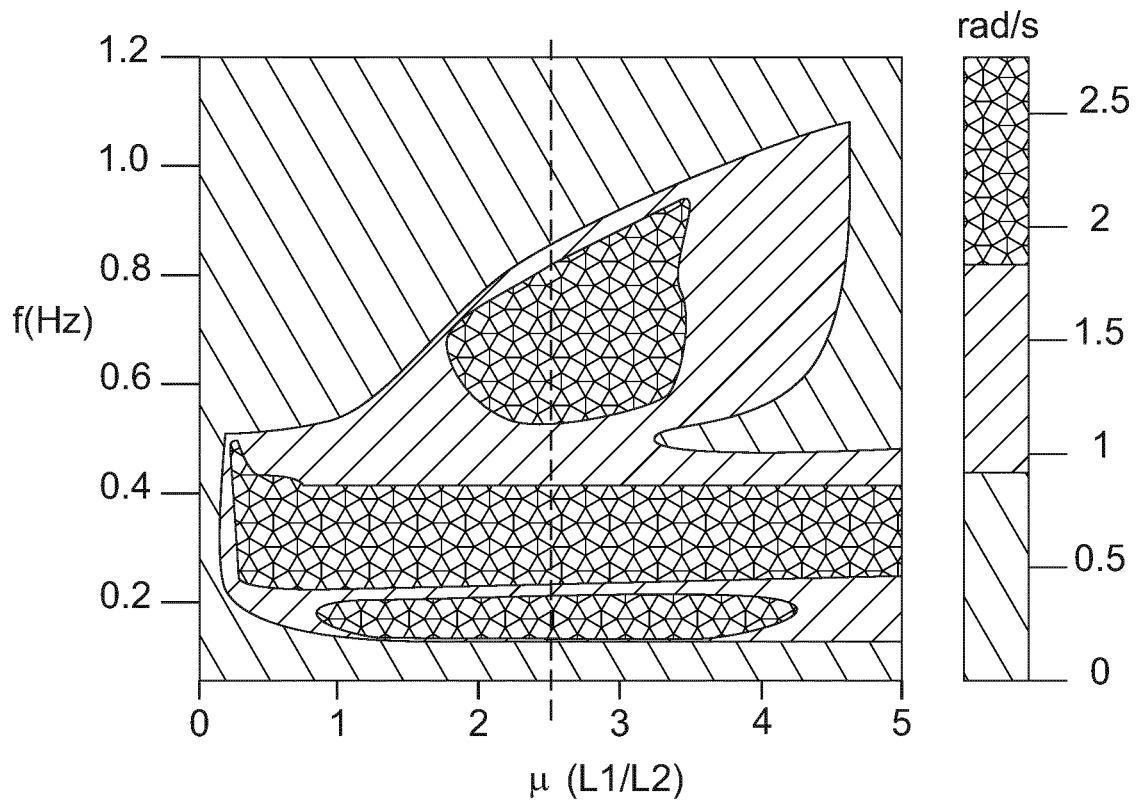
FIG. 5 provides a schematic illustration of an RMS average angular velocity graph in function of the waves frequency and the length ratio $\mu$ for a system in accordance with a preferred embodiment of the invention.

FIG. 5 provides a schematic illustration of a root mean square, RMS, average angular velocity graph in function of the wave frequency (Hz) and the length ratio $\mu$ of a system in accordance with the invention. The system may be similar or identical to those described in relation with any of FIGS. 1 to 3. The $\mu$ ratio corresponds to the arm length ratio L1/L2. The current graph illustrates the first rotation speeds at the first arm, namely the rotation speed used for activating the electric generator.

In the current experiment, which is optionally a simulation, the frequency f and the ratio $\mu$ are explored. For the double pendulum configuration, a sweeping of both the ratio $\mu$ (L1/L2) and the excitation frequency f is carried out. The frequency is explored in a range from 0.1 to 1.2 Hz.

In the current experiment, the maximum inclination angle $\alpha\_max$ parameter is set to 3°. The first weight W1 of the first arm is 0.1 kg. The second weight W2 of the second arm is 0.9 kg. Then the total arm weight is 1 kg. The total arm length (L1+L2), when the arms are aligned, is 0.15 m. At $\mu=2.5$, L1=0.107 m, L2=0.043 m, there is an optimum value. One can notice a domain of full locking with the maximum averaged RMS angular velocity $\theta'_1$ from 0.1 Hz to 0.85 Hz for the excitation frequency. Moreover, these arm lengths allow a compact design, which is suitable for an autonomous drifting buoy.

When the length ratio $\mu$ ranges from 1.5 to 3.5, the rotation speed is of at least 1.5 rad/s. When the length ratio $\mu$ ranges from 2 to 3, the first rotation speed $(d\theta_1/dt=\theta'_1=\dot{\theta}_1)$ is generally of at least 2 rad/s. Then the rotation of the first arm is essentially fast, and the generator provides more power. This is an optimization stage to get the best energy harvesting conversion yield from ocean's waves oscillations into angular velocity and angular acceleration.

In order to go deeper in the invention, it is also interesting to investigate accelerations and speeds over time at the optimal $\mu$ ratio (L1/L2) of 2.5. For the current study, the following parameters are selected: a wave frequency of 0.1 Hz, and a maximum pitch angle α_max=8°.

As a benchmark for comparison, a single arm with a weight of 1 kg and a length of 15 cm enables a peak-to-peak angular velocity $θ'_1\_SPp-p=10$ rad/s and a peak-to-peak angular acceleration of $θ''_1\_SP\_p-p=20$ rad/s². With the labelling SP meaning Simple Pendulum configuration (one arm).

By contrast, the system in accordance with the invention with two pivotably connected arms provides a peak-to-peak angular velocity $θ'=40$ rad/s, and a peak-to-peak angular acceleration of $θ''_1\_DPp-p=2000$ rad/s² ($d²θ1/dt²=θ''1=\ddot{θ}1$). With the labelling DP meaning Double Pendulum (two arms) configuration.

The latter values are higher than those of the simple pendulum configuration, although the two systems have the same total weight and the same maximum arm extension. The invention increases the rotation speed and the rotation acceleration; by splitting the lengths and distributing the weights. The electric generator produces more electrical power in the double pendulum configuration (with two arms 30 and 32 as referenced in FIGS. 1 to 3) for the same ocean's waves movements in amplitude and frequency.

Figure 6A:
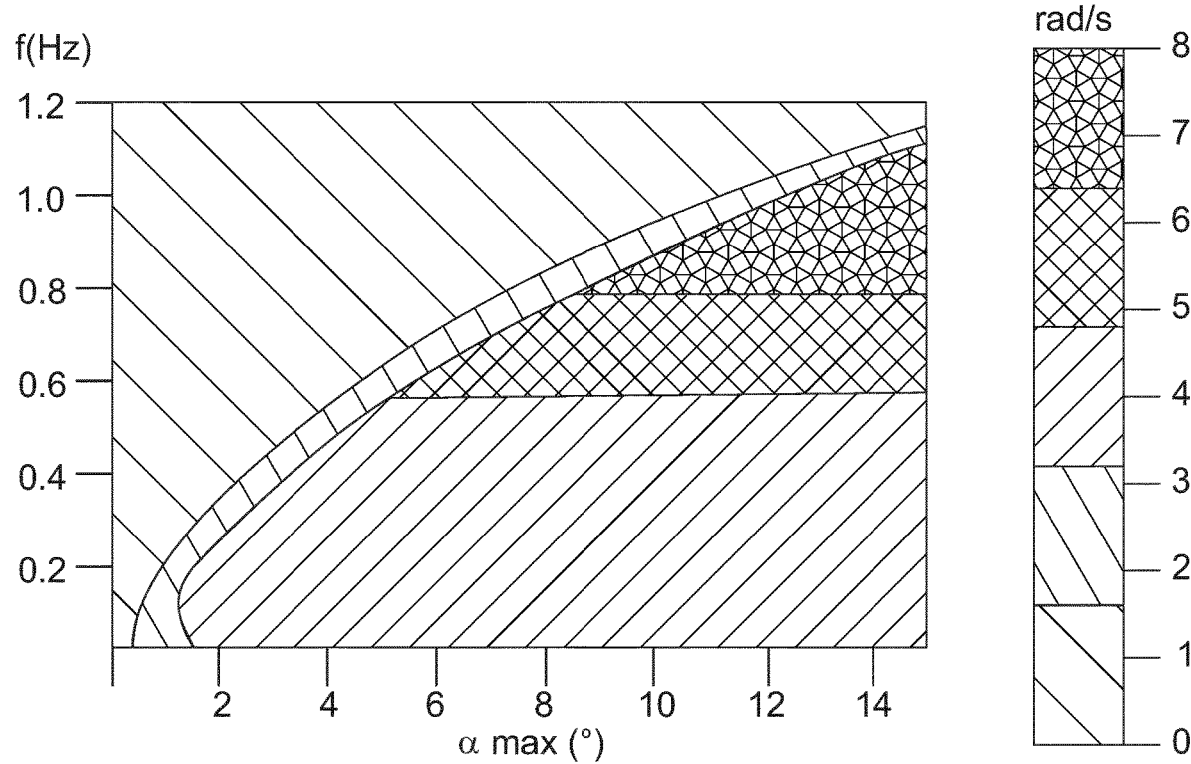
FIGS. 6A and 6B provide schematic illustrations of RMS average angular velocities, in function of waves' frequency and the pitch angle of the waves' oscillations for a simple pendulum, and for a system in accordance with a preferred embodiment of the invention respectively.
Figure 6B:
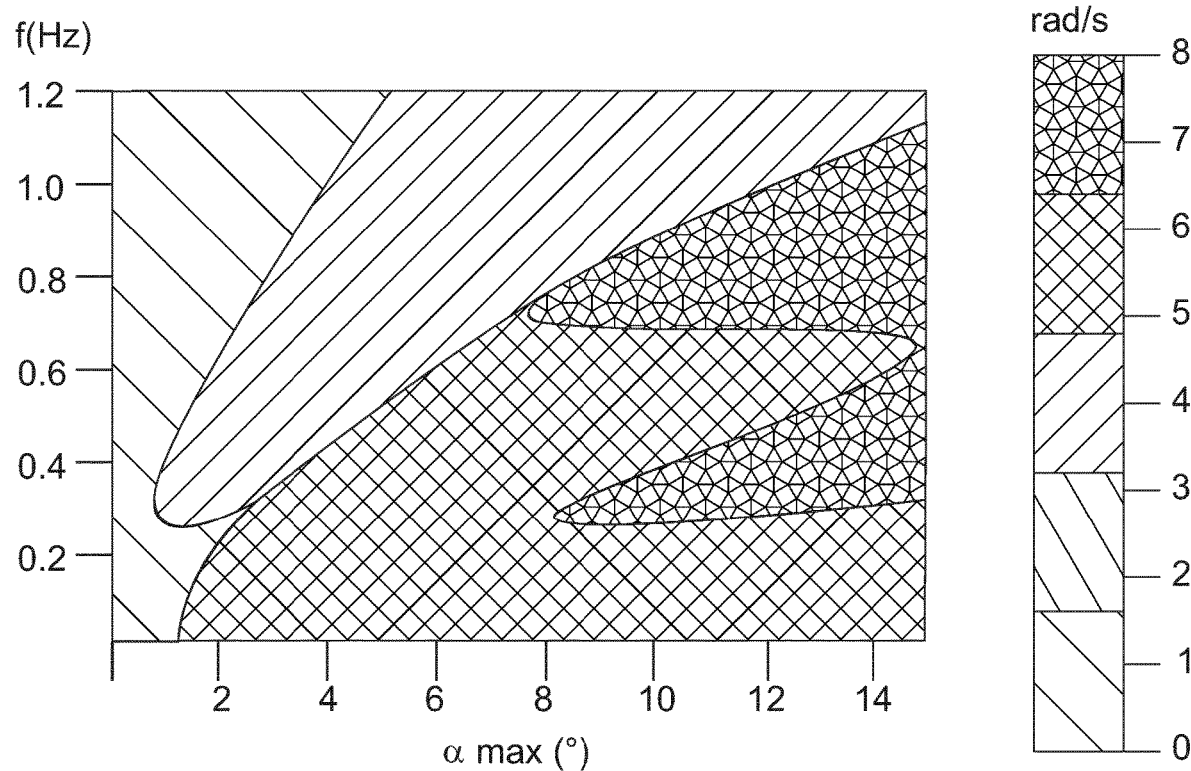

FIGS. 6A and 6B provide schematic graphs of the RMS average angular velocities (rad/s) for a system with a single arm (FIG. 6A), and a system with two arms in accordance with the invention (FIG. 6B). The graphs in FIGS. 6A and 6B are in function of frequency (Hz) and maximum pitch angle α_max(° of the system's oscillations. The current system corresponds to those described in relation with FIGS. 2 to 3.

For the two systems, in order to carry out the performance benchmarking, an identical total weight of 1 kg is maintained. A similar maximum value of the arms extension of 0.15 m is selected. Both systems are excited by a sinusoidal low frequency wave at 0.23 Hz with a maximum pitch angle α_max=8° mimicking the ocean's wave excitation. Then, the real time pitch angle α(t) of the system may be provided by the following equation:

$$α(t)=α_{max}·\cos(2·π·f·t) \qquad \text{equation 11:}$$

From the comparative graphs in FIG. 6A and FIG. 6B, a bigger domain of high averaged angular velocity may be observed with the double pendulum solution. For the situation on FIG. 6B with a system with two arms in accordance with the invention, the domain above 5 rad/s is more spread. The domain below 2 rad/s is smaller. More constant and higher electrical power is available in the latter configuration.

The Maxwell-Faraday law of induction provides that: Equation 12:

$$\begin{aligned}emf &= -\frac{d}{dt}\oint \vec{B}(t)·\vec{n}_s·dS \\ &\cong -\frac{d}{dt}\oint \frac{dB}{dθ1}·\frac{dθ1}{dt}\vec{n}_B·\vec{n}_s·dS \\ &= -\frac{d}{dt}\oint \frac{dB}{dθ1}·\dot{θ}1·\vec{n}_B·\vec{n}_s·dS\end{aligned}$$

for a surface S constant over time, with $\vec{n}_s·dS$ the infinitesimal vector element of surface where the magnetic field $\vec{B}(t)$ is flowing over time. n B is the directional vector of the magnetic field B.

It may be deduced from the above equation 12 that the first angular velocity $\dot{θ}1(=dθ1/dt)$ has a direct impact on the induction voltage also called electromotive force (emf). It means that more angular velocity $θ'1 (=dθ1/dt)$ will produce more electric power at the electric output of the generator.

Figure 7A:
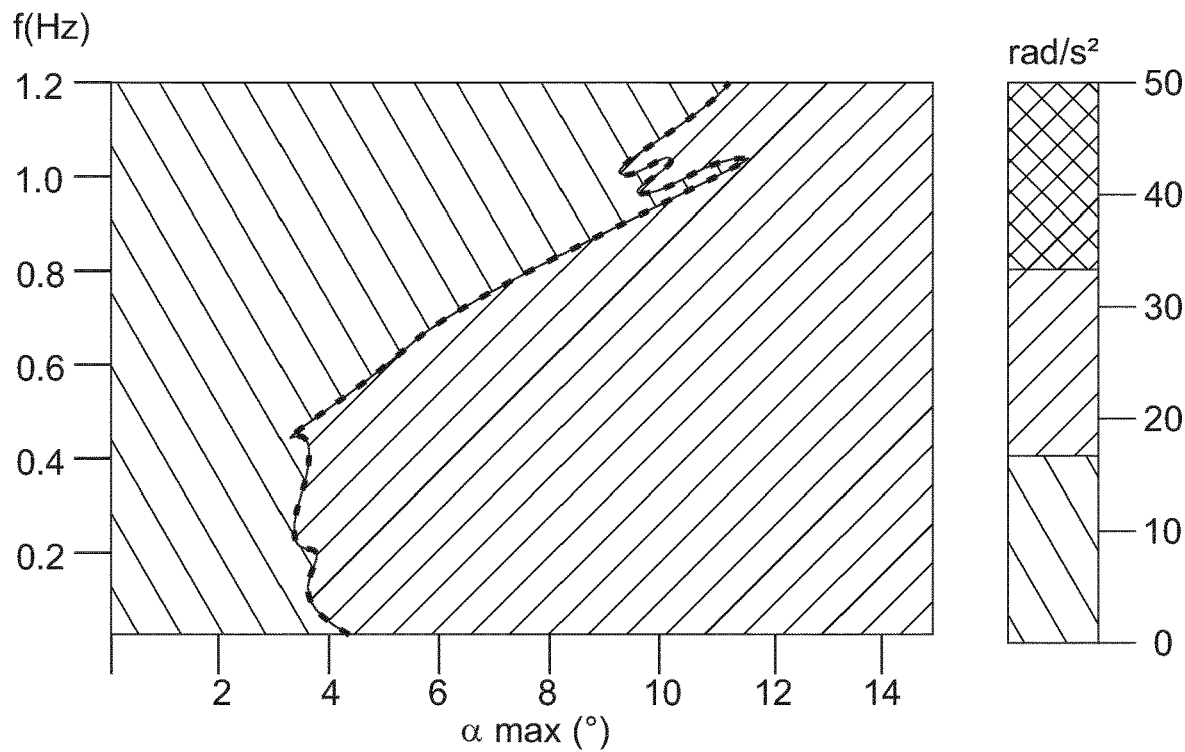
FIGS. 7A and 7B provide schematic illustrations of RMS average angular accelerations, in function of waves' frequency and the pitch angle of the waves' oscillations for a simple pendulum, and for a system in accordance with a preferred embodiment of the invention, respectively.
Figure 7B:
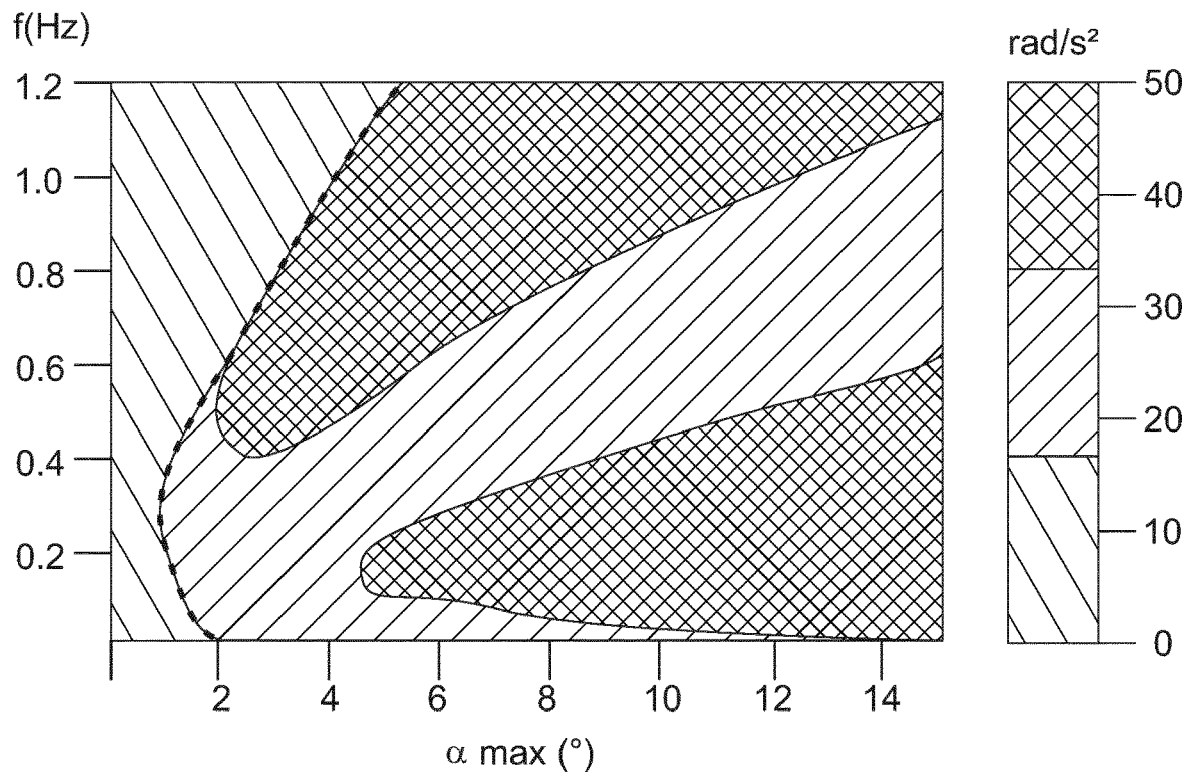

FIGS. 7A and 7B provide schematic graphs of the RMS average angular accelerations (rad/s²) in function of frequency and tilt angle of the waves' oscillations for a simple pendulum system with a single arm (FIG. 7A), and a double pendulum system with two arms in accordance with the invention (FIG. 7B). The system in accordance with the invention corresponds to the one described in relation with FIGS. 2 and/or 3.

A dashed line represents the cogging torque effect resulting from the generator and its optional gearing. This counter electromotive force forms a torque that the first arm needs to overcome in order to move. The dashed line standing for the cogging torque is at the border of an area wherein the rotation acceleration level is negligible. If the first torque transmitted by the first arm is smaller than the cogging torque, also designated as starting torque; then the first arm remains stuck in position and does not manage to activate the generator. No energy harvesting into electric power is done.

It means that to start the rotation of the generator the applied harvested force on the first rotation axis needs to achieve a threshold. This threshold comes from the magnetic force separating the stator and the rotor in the generator, but also from considering any gearbox between the axis of the electromagnetic generator and the angular acceleration of the movement to convert. The RMS average value of this angular acceleration $d²θ_1/dt²$ (rad/s²) was calculated and mapped against the excitation frequency f (Hz) and the tilt angle, or pitch angle α of the ocean's waves oscillations regime.

Here also, from these comparative graphs, one can notice the bigger domain of high averaged angular accelerations with the double pendulum configuration. The system in accordance with the invention offer a broader domain of at least 20 rad/s². The invention also provides an important proportion beyond 35 rad/s². More constant and higher electrical power is produced. It becomes easier to overcome the cogging torque of the generator. Higher angular accelerations mean more mechanical efficiency to start the generator and more kinetic energy to deliver against the dynamic torque due to eddy current in the generator during stabilized rotation speed. Hence, the double pendulum structure is more prone to drive similar and more powerful generator in an efficient way compared to the single pendulum one.

By comparison of the cogging torque borders, the system in accordance with the invention overcomes the cogging torque with a smaller pitch angle α amplitude. Then, the invention generates electric power in more configurations, notably with a broader excitation range. The system generates power on an extended inclination range, in more situations.

With respect to the wave frequency, the invention exhibits a behaviour that is more homogeneous than the single arm device. In the frequency range from 0.7 Hz to 1.2 Hz, the system generates more electric power with a maximum pitch angle α from 4° to 10°.

Thus, this further confirms that the invention generates electric power in more configurations. The invention also generates more power on broader frequency and pitch angle ranges.

Figure 8A:
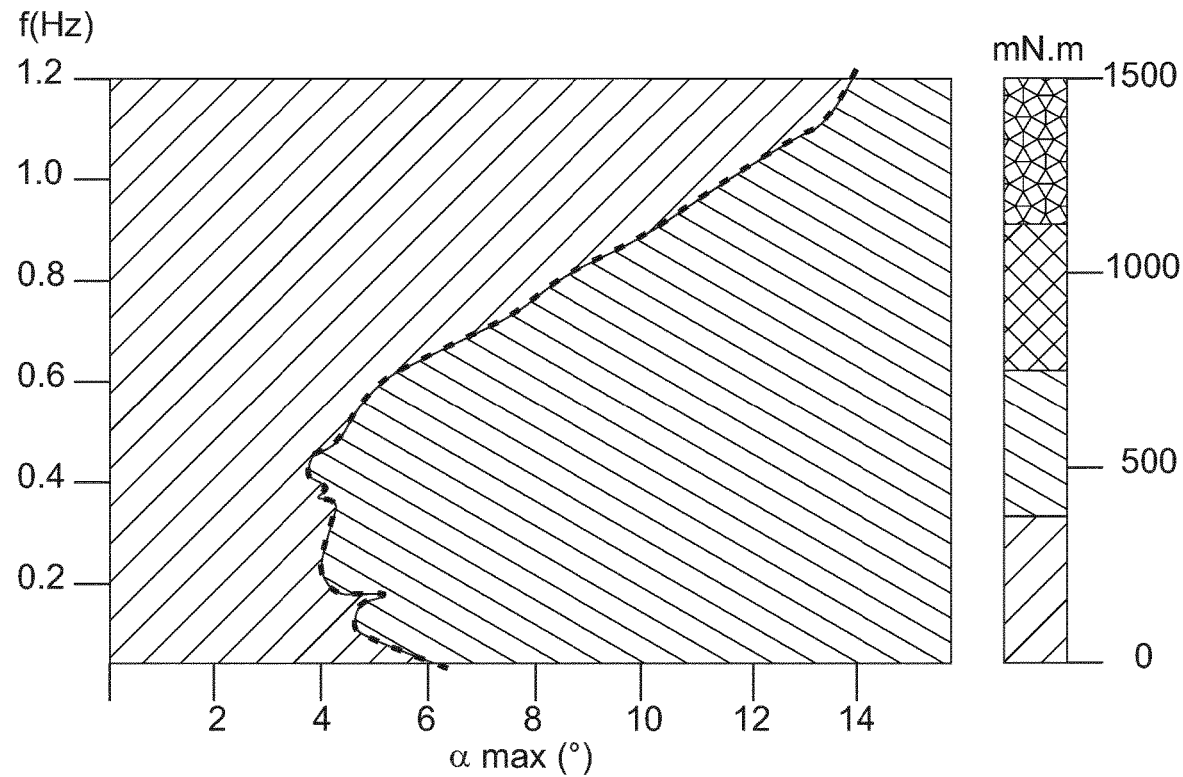
FIGS. 8A and 8B provide schematic illustrations of generated torque mappings against the waves' frequency and the pitch angle for simple pendulum and for a system in accordance with a preferred embodiment of the invention, respectively.
Figure 8B:
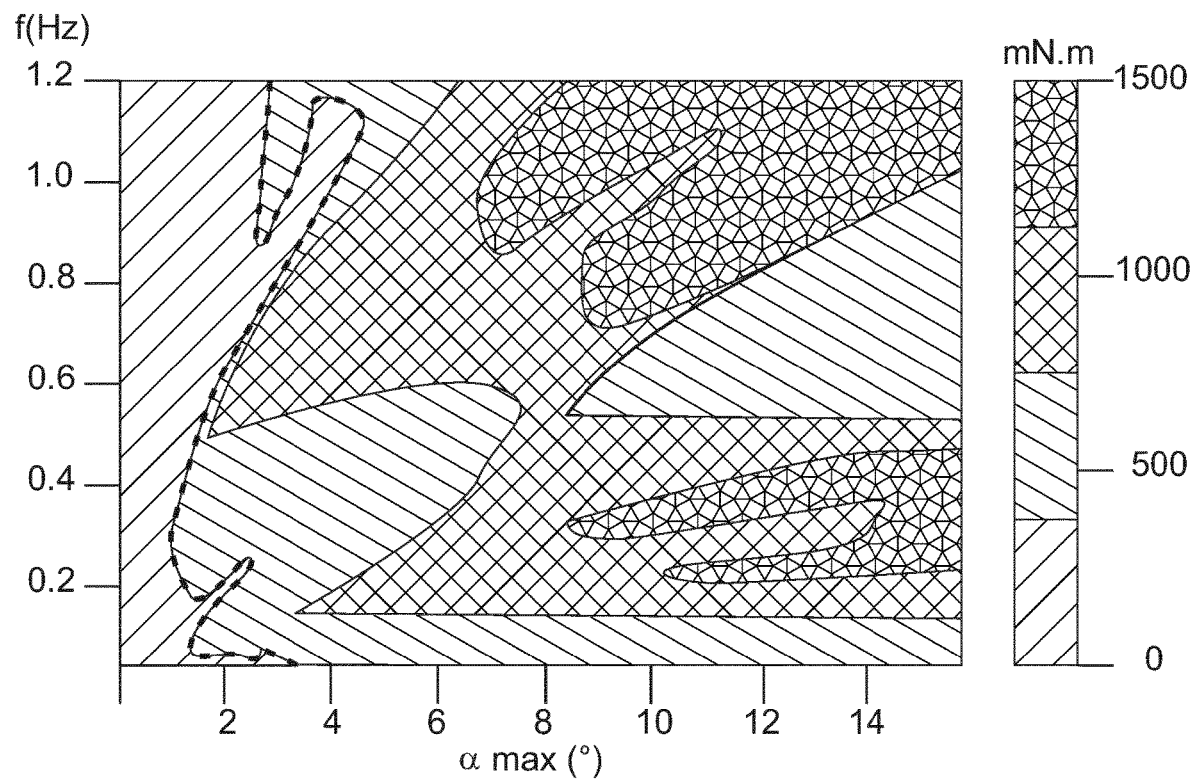

FIGS. 8A and 8B provide schematic graphs of the generated torque mappings against the waves' frequency and the pitch angle α amplitude for simple pendulum with a single arm (FIG. 8A), and double pendulum systems with two arms in accordance with the invention (FIG. 8B). The system in accordance with the invention corresponds to the one described in relation with FIGS. 2 and/or 3. The mapping comprises areas with torque variations. The wave excitation frequency ranges from Hz to 1.2 Hz. In the meantime, the maximum pitch angle α starts at 0° and reaches 16°.

A dashed line represents the cogging torque resulting from the generator and the gearbox. In the current embodiment, the cogging torque is of 24.75 mN·m applied to the first arm.

As apparent from the comparative graphs, the invention increases the torque transmitted by the first arm to the electric generator. With the reference single arm system, the maximum torque is about 500 mN·m whereas the system in accordance with the invention offers a torque of 1500 mN·m. Hence, the invention is adapted for generating more electric power.

In addition, the reference system with a single arm presents a torque of 0 mN·m when the pitch angle α is set to up to 4°. By contrast, the invention offers an interesting torque for a pitch angle amplitude α starting from 1°. Then, the invention provides an electric power with a reduced excitation angle, and a low ocean's wave amplitude with respect to the height of the system.

Figure 9A:
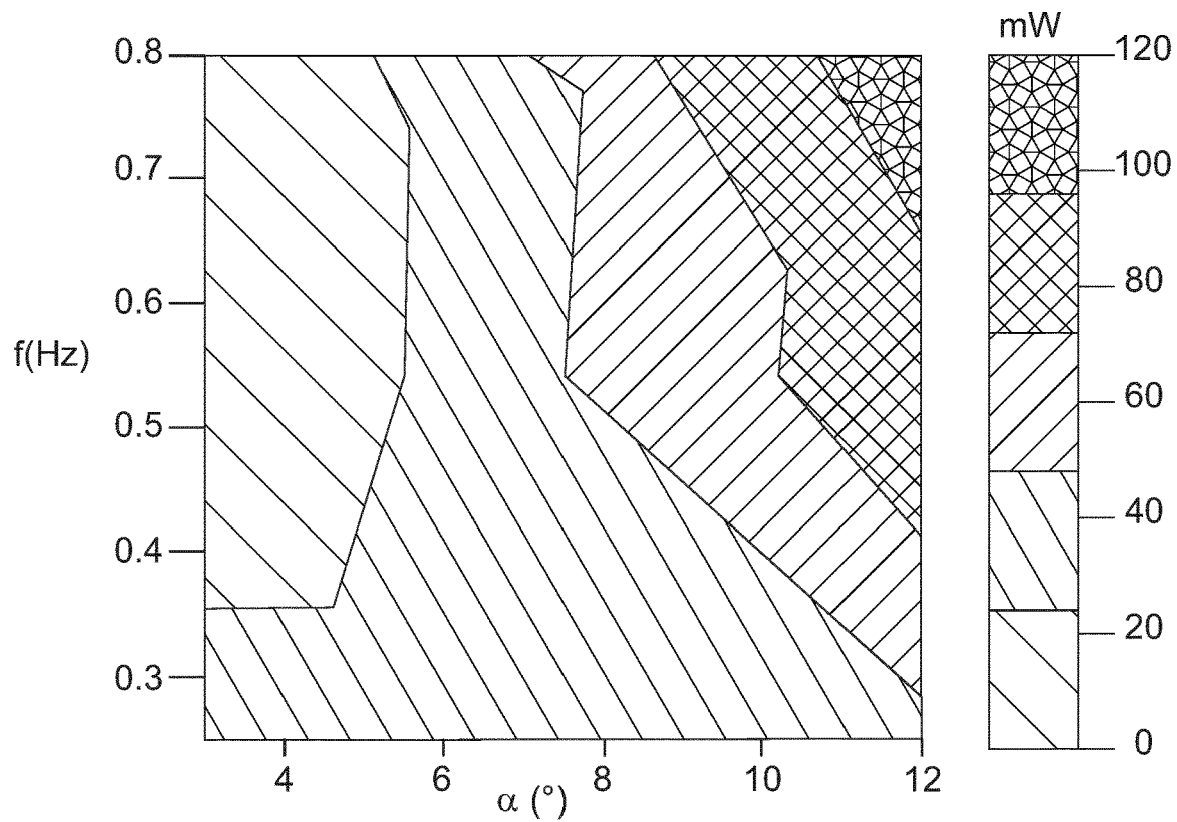
FIGS. 9A and 9B provide schematic illustrations of RMS AC electrical powers generated, in function of wave frequency and pitch angle; for a simple pendulum and for a system with a vertical rotating axis in accordance with a preferred embodiment of the invention respectively.
Figure 9B:
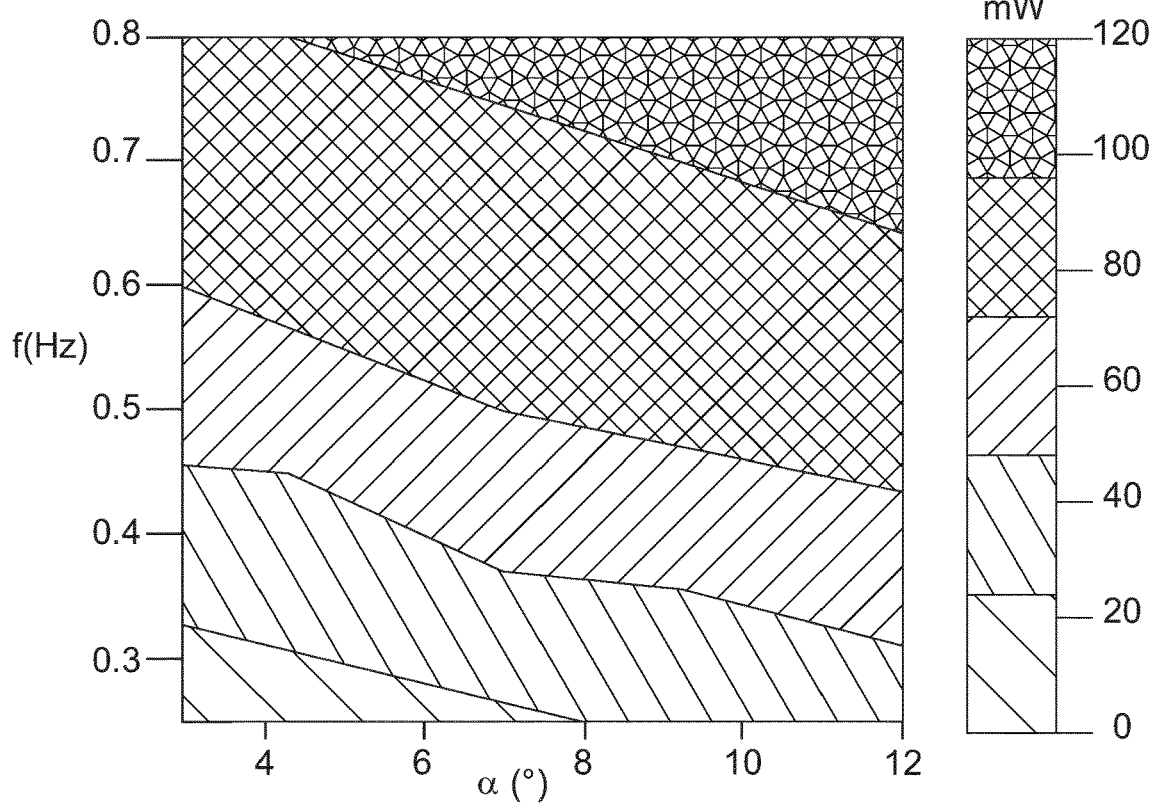

FIGS. 9A and 9B provide schematic illustrations of RMS AC electrical powers generated which are measured on wires over a resistive charge of 100 ohms, for a simple pendulum with a single arm (FIG. 9A), and a double pendulum system with two arms in accordance with the invention (FIG. 9B).

The system in accordance with the invention corresponds to the ones described in relation with FIGS. 2 and/or 3. The rotation axes are generally vertical, and the arms are generally horizontal and generally draw horizontal trajectories.

In order to investigate the generated electric power, the excitation frequency and the pitch angle vary in order to identify domains with interesting power generations. The investigated frequency varies from 0.25 Hz to 0.8 Hz. The maximum excitation pitch angle α_max ranges from 3° to 12°. Under realistic conditions, given unfavourable initial conditions, the simple pendulum can stay in a low amplitude oscillatory state, given a certain wave frequency and pitch angle amplitude, yielding much less power. A narrow domain allows to generate a power of at least 60 mW, which is still not enough in several applications.

The double pendulum, because of its chaotic trajectory behaviour, tends to rapidly exit such oscillatory state and yield as much electric power as if the initial conditions were ideal. The system in accordance with the invention generates at least 75 mW on the majority of the graph of FIG. 9B. A large domain is beyond 100 mW which is enough for several applications requiring autonomous power supplying of electronics.

These experimental results, obtained on a real test bench, confirm the trends of our previous numerical modelling and parameters optimization (masses ratio and arm length ratio). The double pendulum structure is then prone for energy harvesting from the various movements of low frequency ocean's waves.

Figure 10A:
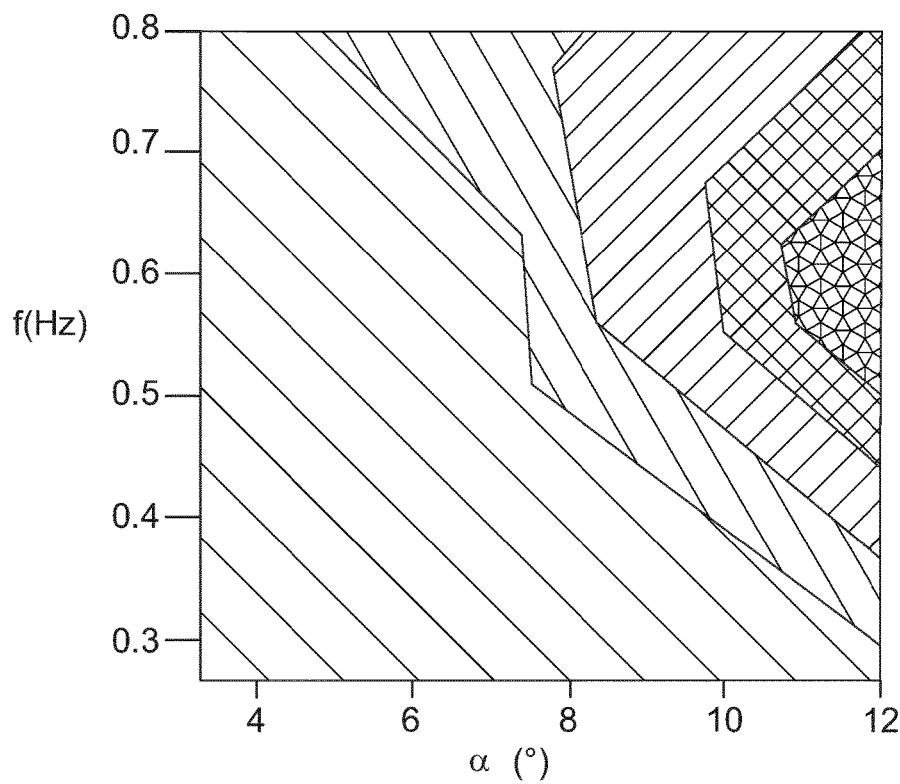
FIGS. 10A and 10B provide schematic illustrations of RMS AC electrical powers generated, in function of wave frequency and pitch angle amplitude; for a simple pendulum and for a system with horizontal rotating axis in accordance with a preferred embodiment of the invention respectively.
Figure 10A:
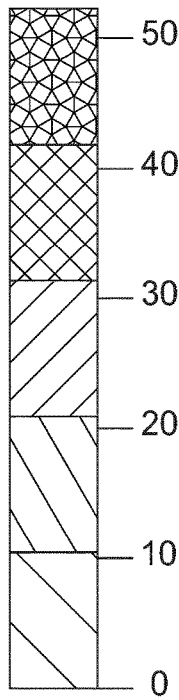
Figure 10B:
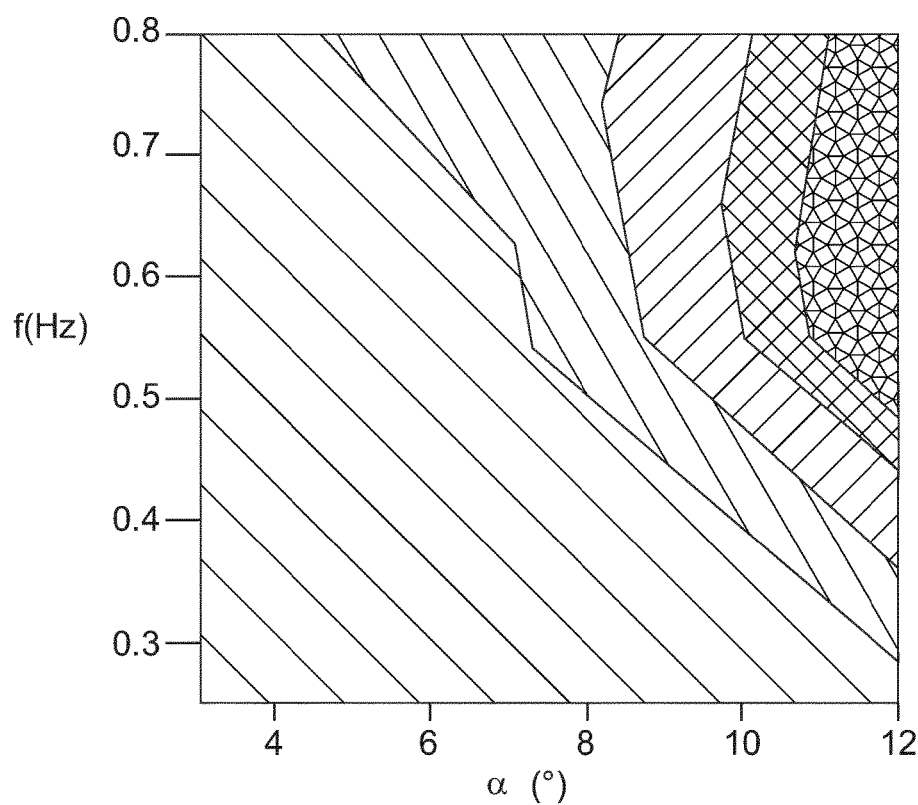
Figure 10B:
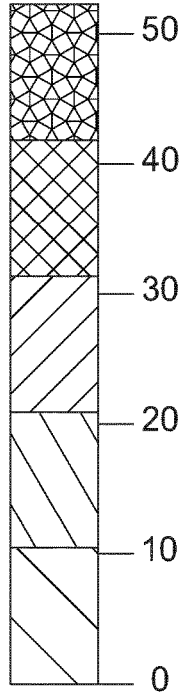

FIGS. 10A and 10B provide schematic illustrations of RMS AC electrical powers generated which are measured on wires over a resistive charge of 100 ohms, for simple pendulum with a single arm (FIG. 10A), and double pendulum systems with two arms in accordance with the invention (FIG. 10B). The system in accordance with the invention corresponds to the one described in relation with FIG. 1.

In order to investigate the generated power, the excitation frequency f (Hz) and the pitch angle α)(° vary in order to identify domains with interesting power generations. The frequency ranges from Hz to 0.8 Hz. The maximum excitation pitch angle α ranges from 3° to 12°.

We can notice from the comparative graph that the double pendulum still tends to broaden the working frame to lock the energy harvesting from external mechanical excitation of waves to a larger range of frequencies.

By comparison, the domain in which the generated power is of at least 40 mW is greater with the invention than with a single arm. The same conclusion applies with regard to the domain in which the generated power is of at least 30 mW. In peculiar, the system in accordance with the invention provides more electric power with a frequency of at least 0.7 Hz. The invention also improves the output for excitation angles of at least 10°.

Figure 11:
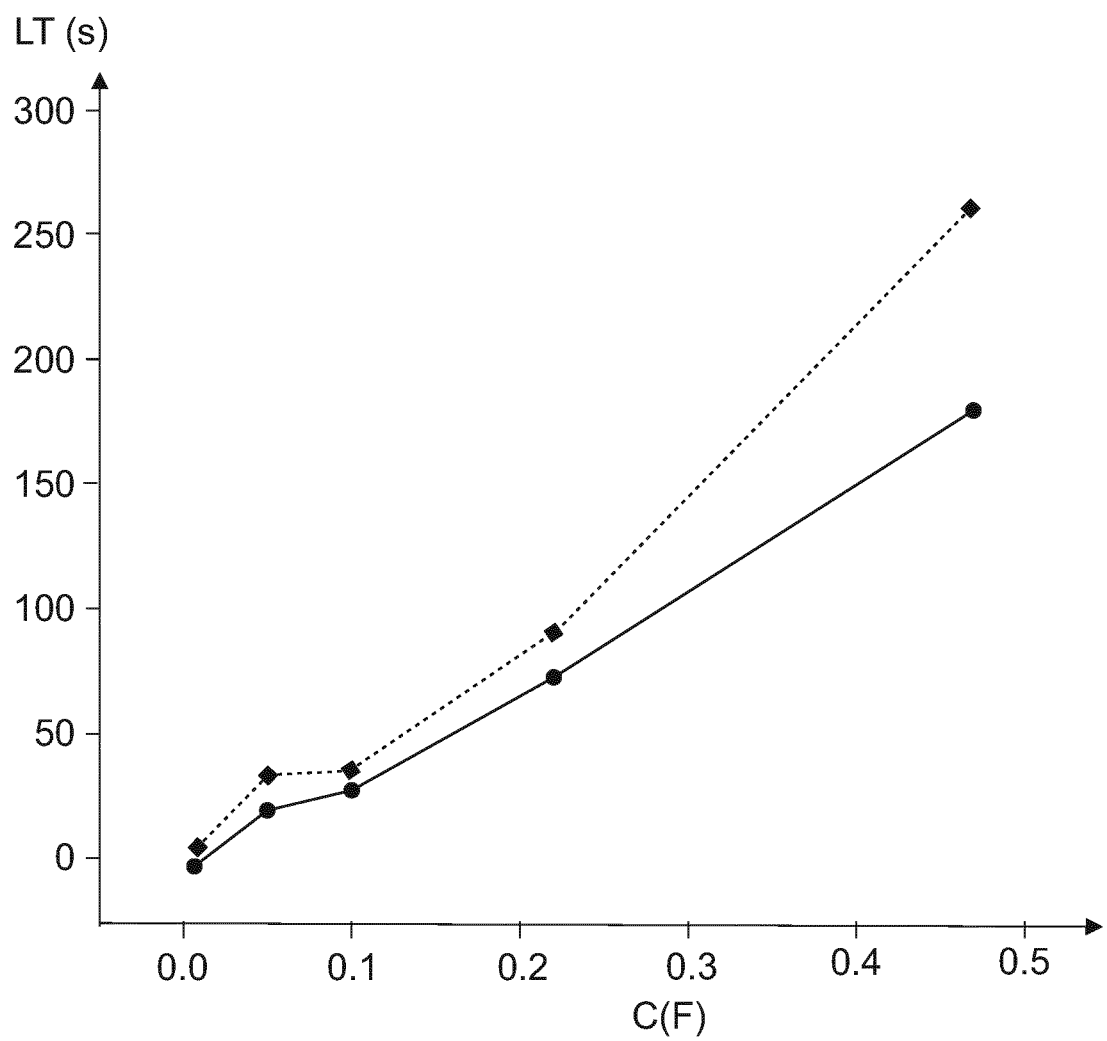
FIG. 11 provides a comparative illustration of the charging time for different supercapacitor values between a single arm system and a system in accordance with a preferred embodiment of the invention.

FIG. 11 provides an illustration of the load time gap to achieve a value of 3.3 Volts between the two systems of pendulum structures, for different values of supercapacitors. The solid line illustrates the load time to achieve 3.3 V depending on the capacitance value for a system in accordance with the invention in a double pendulum configuration with two moving arms 30 and 32. The dashed line illustrates the load time depending on the capacitance for a system with a single arm, for instance wherein the two arms are rigidly maintained in an aligned single pendulum configuration. Then the pivot joint at their interface is blocked.

It has been observed that the invention reduces the charging time of an energy storing device, such as a supercapacitor. A supercapacitor with a capacity of at least: 0.1 F, or 0.47 F, or 0.6 F is useful as an electrical energy reservoir to power supply sea analysing station and a wireless communication module.

By comparison with a single arm system, the invention reduces the charging time. The invention is faster for reaching higher voltages, for instance at least 3.3 V. In an experiment, with a supercapacitor comprising a capacity of 0.47 F, with a maximum pitch angle α_max of 10°, and a wave excitation frequency of 0.4 Hz; the system in accordance with the invention reaches the voltage of 3.3 V in 175 seconds; whereas the single arm reference system needs 285 seconds.

It may also be observed that the invention generally improves the charging rate.

The invention improves the charging speed depending on the capacitance. As apparent from the current figure, the curve corresponding to the invention is generally less inclined than the curve associated with a single arm system. This phenomenon is more apparent with a capacity of at least 0.1 F.

The features defined in relation with sea or ocean may be generalized to any water area having uneven surface portions. A wave may be created by a ship passage.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:

1. A system configured for producing electric power from sea waves, the system comprising:
 a buoyant body including a watertight enclosure in which the following are arranged:
  an electric generator including an input shaft adapted to rotate with respect to the buoyant body;
  a first arm coupled to the electric generator;
  a second arm; and
  a pivot joint rotatably joining the second arm to the first arm, said pivot joint being linked to the electric generator by the first arm, wherein the input shaft defines a first rotation axis and the pivot joint defines a second rotation axis, and wherein the first rotation axis and the second rotation axis are substantially parallel to one another.

2. The system in accordance with claim 1, wherein the system extends along a principal axis, wherein the buoyant body comprises an equilibrium orientation, said first rotation axis and said second rotation axis extending substantially in parallel to the principal axis; and wherein the first arm and the second arm extend substantially perpendicularly to the principal axis.

3. The system in accordance with claim 1, wherein the system extends along a principal axis, wherein the buoyant body comprises an equilibrium orientation, said first rotation axis and said second rotation axis extending substantially perpendicularly to the principal axis; and wherein the first arm and the second arm extend substantially in parallel to the principal axis.

4. The system in accordance with claim 1, wherein the first arm defines a first length and the second arm defines a second length, and wherein the second length is less than the first length.

5. The system in accordance with claim 4, wherein a length ratio of the first length divided by the second length has a value of between 2 and 3.

6. The system in accordance with claim 1, wherein the first arm defines a first weight, and the second arm defines a second weight, and wherein the second weight is greater than the first weight.

7. The system in accordance with claim 6, wherein a weight ratio of the second weight divided by the first weight has a value of between 0.8 and 5.

8. The system in accordance with claim 6, wherein the system defines an overall weight, and wherein the overall weight divided by a sum of the first weight and the second weight has a value of between 2 and 6.

9. The system in accordance with claim 1, wherein the first arm defines a first length and a first weight and the second arm defines a second length and a second weight, wherein the second length is less than the first length and the second weight is greater than the first weight, wherein a quotient of the second weight divided by the first weight is divided by a quotient of the first length divided by the second length so as to define an inertia ratio that has a value of between 2 and 3.

10. The system in accordance with claim 1, wherein along the first arm, said first arm comprises a first weight block at the pivot joint, and along the second arm, said second arm comprises a second weight block at an opposite side of the pivot joint.

11. The system in accordance with claim 1, wherein the electric generator comprises an inner rotor and a gearbox coupling the first arm to the inner rotor, said gearbox defining a multiplication ratio of at least 30.

12. The system in accordance with claim 1, wherein the system defines a principal axis, and means configured for reducing rotation of the buoyant body about the principal axis.

13. The system in accordance with claim 1, further including at least one of a counter weight, a ballast, and a fixation means; configured for orienting the buoyant body in a predefined orientation with respect to a wave surface.

14. The system in accordance with claim 1, wherein the system comprises a flotation line, the first and second arms being arranged above said flotation line along a main axis of the system.

15. The system in accordance with claim 1, wherein the system defines a gravity centre, at least one of the first arm and the second arm being arranged at a distance from said gravity centre along a main axis of the system.

16. The system in accordance with claim 1, wherein the electric generator comprises a rotating link rotatably coupling the input shaft to the buoyant body, said rotating link defining a damping coefficient of at least 0.016 Ns/m.

17. The system in accordance with claim 1, wherein the electric generator comprises a gearbox with a multiplication factor of at least 30 and provides a cogging torque of at least 24 mN.m at the input shaft.

18. An autonomous floating analysis station, comprising:
 the system in accordance with claim 1; and
 a water passage arranged closer to an immersible end of the system along a principal axis thereof, than the first arm and the second arm.

19. The autonomous floating analysis station in accordance with claim 18, wherein the system comprises a communication module including an antenna arranged further from the immersible end of the system along the principal axis thereof, than the first and second arms.

20. The system in accordance with claim 1, wherein the first arm and the second arm are pivotably joined in series to activate the electric generator including a gearbox and the input shaft of the system.

* * * * *